(12) United States Patent
Rahn

(10) Patent No.: US 9,577,761 B2
(45) Date of Patent: Feb. 21, 2017

(54) CONTROLLING AN OPTICAL TRANSMITTER THAT SUPPORTS MULTIPLE MODULATION FORMATS AND BAUD RATES

(71) Applicant: Infinera Corp., Sunnyvale, CA (US)

(72) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 251 days.

(21) Appl. No.: 14/141,819

(22) Filed: Dec. 27, 2013

(65) Prior Publication Data

US 2015/0333860 A1 Nov. 19, 2015

(51) Int. Cl.
| | |
|---|---|
| *H04J 14/02* | (2006.01) |
| *H04B 10/564* | (2013.01) |
| *H04B 10/572* | (2013.01) |
| *H04L 27/00* | (2006.01) |
| *H04B 10/516* | (2013.01) |
| *H04L 27/34* | (2006.01) |

(52) U.S. Cl.
CPC .......... *H04B 10/516* (2013.01); *H04B 10/572* (2013.01); *H04J 14/0221* (2013.01); *H04L 27/0008* (2013.01); *H04L 27/34* (2013.01)

(58) Field of Classification Search
CPC .. H04J 14/0221; H04B 10/572; H04B 10/564; H04L 27/0008
See application file for complete search history.

(56) References Cited

U.S. PATENT DOCUMENTS

| | | | | | |
|---|---|---|---|---|---|
| 5,745,613 | A | * | 4/1998 | Fukuchi | .................. H04J 14/02 385/1 |
| 5,894,362 | A | * | 4/1999 | Onaka | .................. H04B 10/077 398/34 |
| 6,118,562 | A | * | 9/2000 | Lee | ........................ H01S 5/0687 372/23 |
| 6,240,109 | B1 | * | 5/2001 | Shieh | .................... H01S 5/0687 372/18 |
| 6,335,823 | B2 | * | 1/2002 | Ohshima | ...................... 356/73.1 |

(Continued)

OTHER PUBLICATIONS

Co-pending U.S. Appl. No. 14/141,813, entitled "Controlling an Optical Transmitter That Supports Multiple Modulation Formats and Baud Rates" by Rahn, filed Dec. 27, 2013, 54 pages.

*Primary Examiner* — Shi K Li
*Assistant Examiner* — Mina Shalaby
(74) *Attorney, Agent, or Firm* — Harrity & Harrity LLP; David L. Soltz

(57) ABSTRACT

A device receives a modulation format and a baud rate for transmission of an optical signal, and generates optical signals based on the modulation format and the baud rate. The device generates quadrature-delay-interferometer signals based on the optical signal, the modulation format, and the baud rate, and generates a particular optical signal with a particular wavelength for the modulation format and the baud rate. The device determines whether a point of the quadrature-delay-interferometer signals is associated with the particular wavelength of the particular optical signal, and sets or adjusts the particular wavelength of the particular optical signal for the modulation format and the baud rate based on whether a point of the quadrature-delay-interferometer signals is associated with the particular wavelength of the particular optical signal.

20 Claims, 13 Drawing Sheets

(56) References Cited

U.S. PATENT DOCUMENTS

| | | | | |
|---|---|---|---|---|
| 6,369,923 B1* | 4/2002 | Kuo | H04B 10/504 | 398/91 |
| 6,661,974 B1* | 12/2003 | Akiyama | H04B 10/2513 | 398/158 |
| 7,526,200 B2* | 4/2009 | Nakano | H04B 10/506 | 398/10 |
| 7,986,878 B2* | 7/2011 | Saunders | H04B 10/5053 | 398/25 |
| 8,594,514 B2* | 11/2013 | Rahn | H04B 10/0779 | 398/184 |
| 8,781,327 B2* | 7/2014 | Shen | H04J 14/02 | 398/192 |
| 9,136,972 B2* | 9/2015 | Rahn | H04J 14/0263 | |
| 2001/0019562 A1* | 9/2001 | Kai | H01S 5/0687 | 372/20 |
| 2002/0015202 A1* | 2/2002 | Michishita | H04J 14/02 | 398/79 |
| 2002/0141046 A1* | 10/2002 | Joo | H04B 10/2971 | 359/341.2 |
| 2003/0020981 A1* | 1/2003 | Vujkovic-Cvijin | G02B 6/4249 | 398/79 |
| 2003/0095736 A1* | 5/2003 | Kish, Jr. | B82Y 20/00 | 385/14 |
| 2004/0033004 A1* | 2/2004 | Welch | B82Y 20/00 | 385/14 |
| 2004/0208569 A1* | 10/2004 | Nabeyama | H04B 10/07 | 398/79 |
| 2005/0100345 A1* | 5/2005 | Welch | B82Y 20/00 | 398/183 |
| 2006/0120664 A1* | 6/2006 | Lee | H04B 10/40 | 385/24 |
| 2006/0153253 A1* | 7/2006 | Diffily | H01S 5/06256 | 372/29.02 |
| 2006/0263094 A1* | 11/2006 | Setti | H04B 10/2569 | 398/152 |
| 2006/0291776 A1* | 12/2006 | Lee | H04J 14/02 | 385/24 |
| 2008/0013881 A1* | 1/2008 | Welch | G02B 6/12004 | 385/14 |
| 2010/0067907 A1* | 3/2010 | Byun | H04B 10/506 | 398/58 |
| 2011/0085794 A1* | 4/2011 | Lei | H04B 10/506 | 398/25 |

* cited by examiner

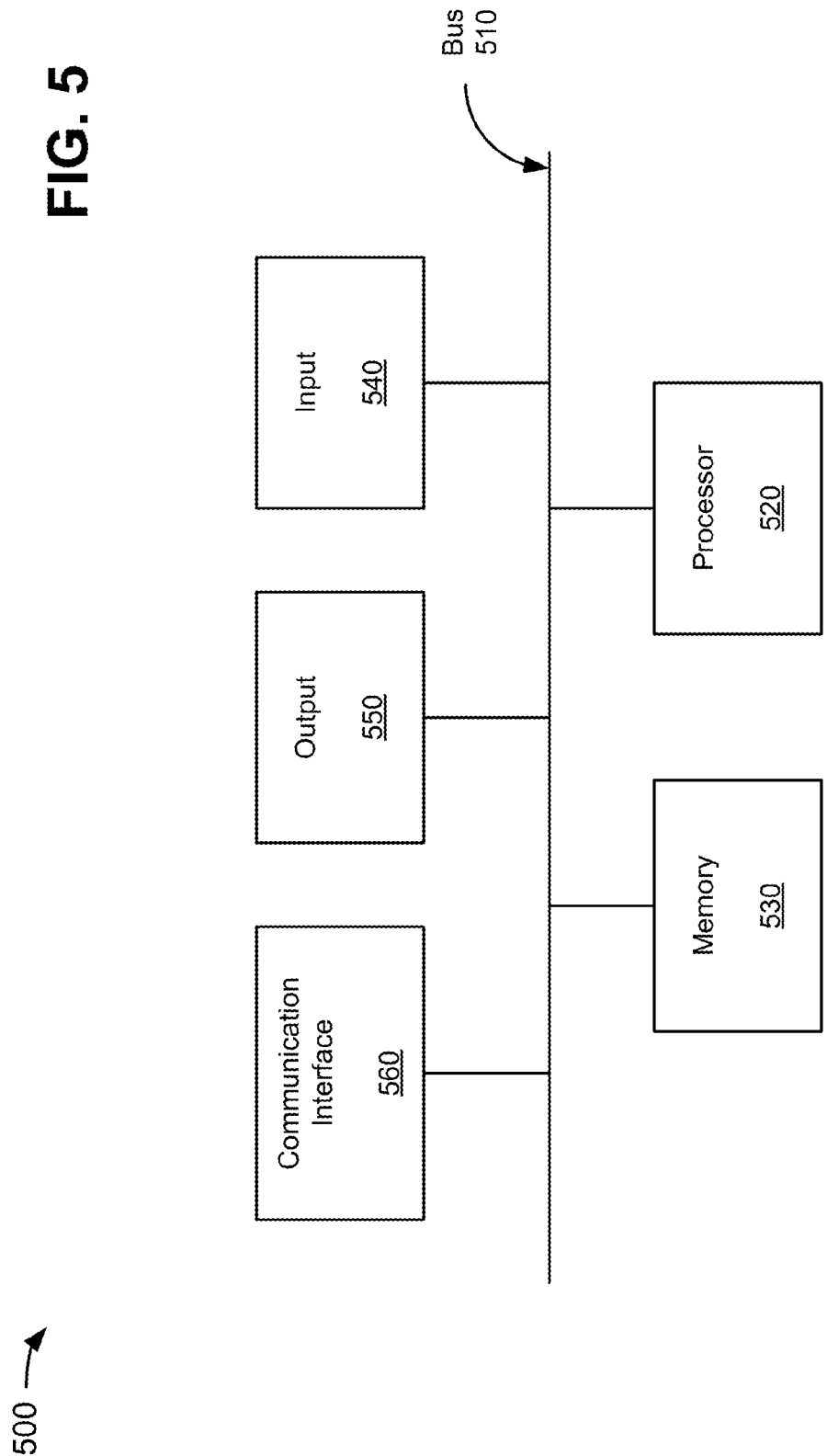

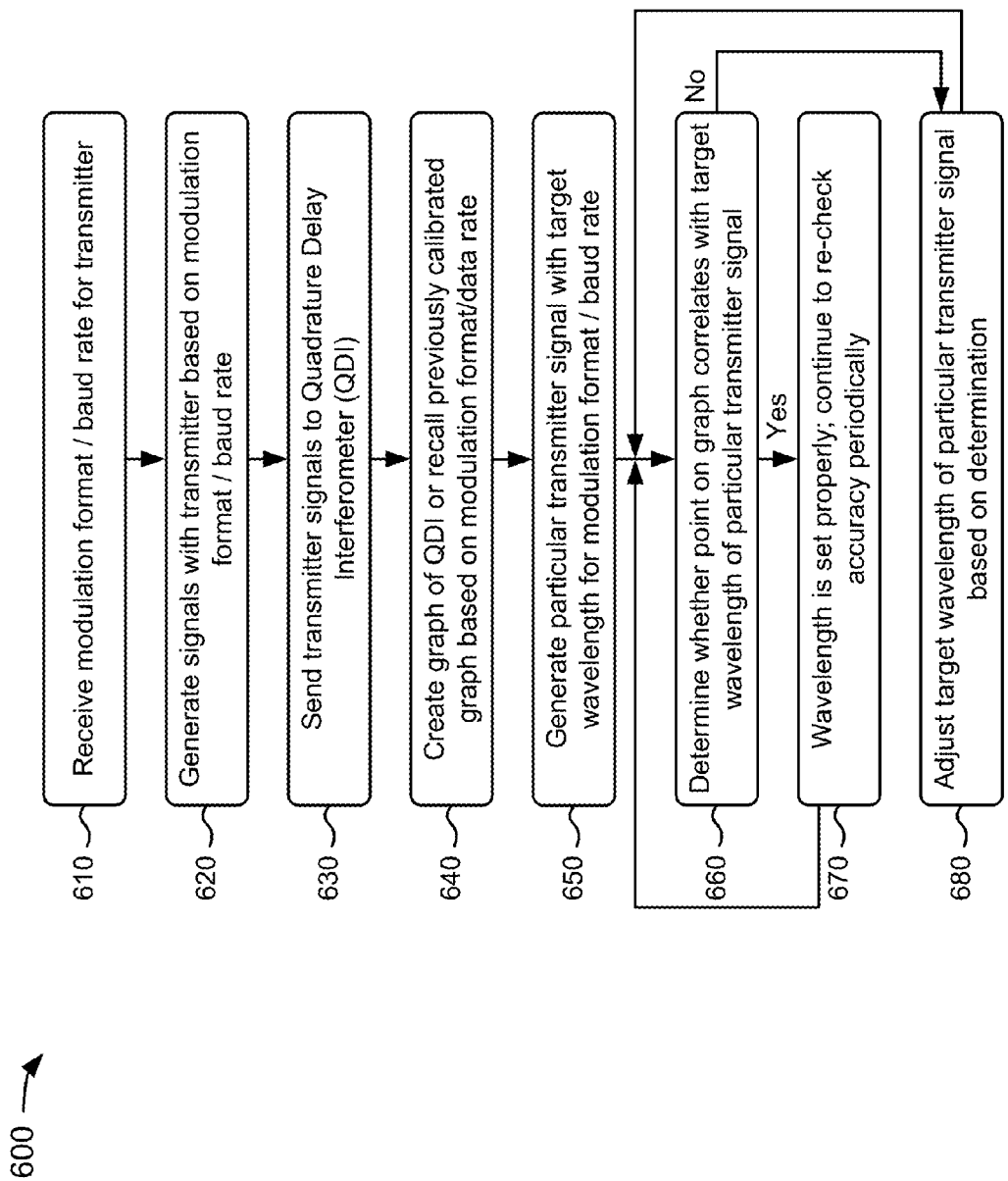

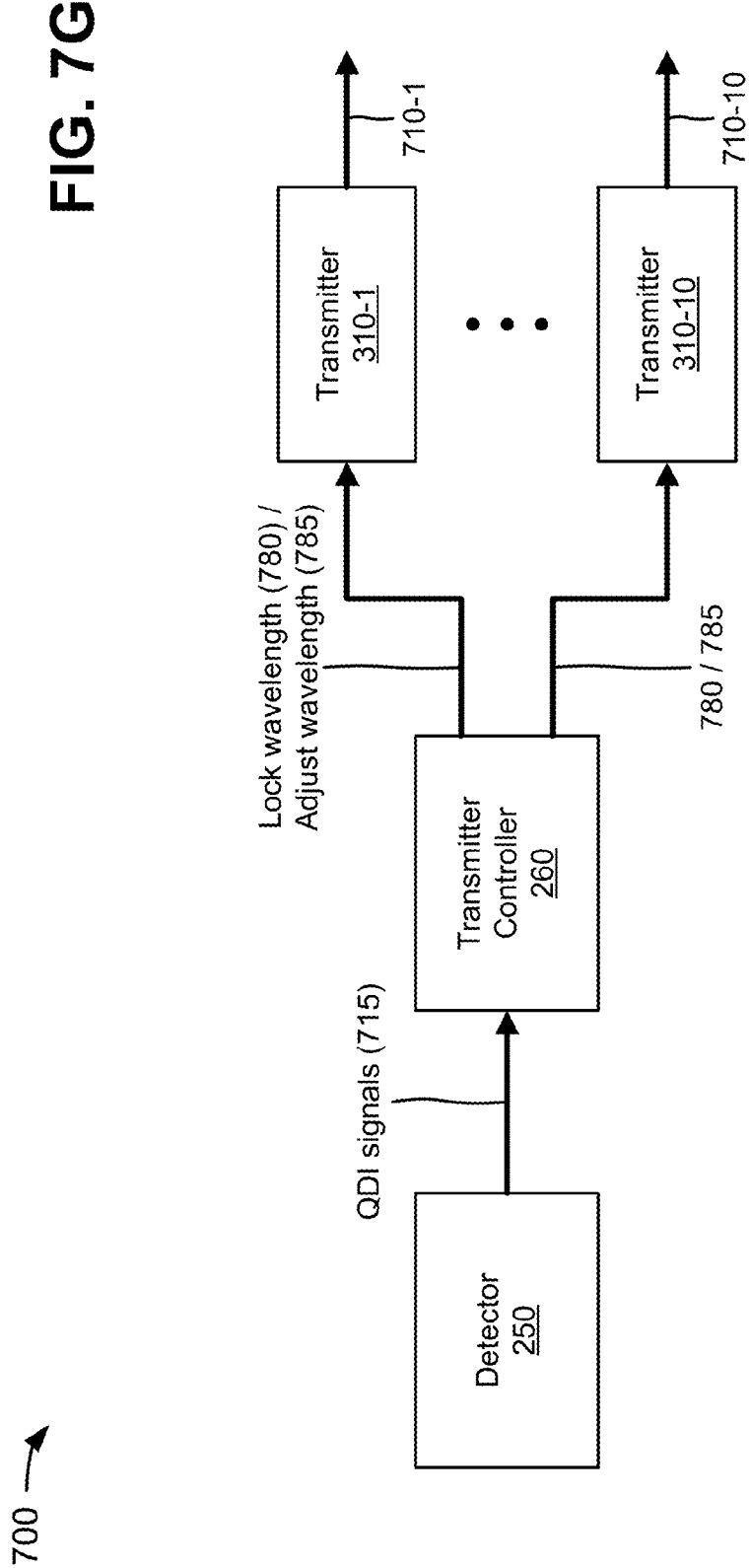

CONTROLLING AN OPTICAL TRANSMITTER THAT SUPPORTS MULTIPLE MODULATION FORMATS AND BAUD RATES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal.

A WDM system may also include a receiver circuit having a receiver (Rx) PIC. The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In a WDM system, the Tx PIC may modulate a phase of a signal in order to convey data (via the signal) to the Rx PIC where the signal may be demodulated such that data, included in the signal, may be recovered. A particular modulation format (e.g., quadrature phase-shift keying (QPSK), quadrature amplitude modulation (QAM), or the like) may be used to modulate the input signal. Different modulation formats correspond to different distances that the input signal may be transmitted. Further, different modulation formats may result in different bit error rates (BERs) associated with the signal. Typical TX PICs support a single modulation format and a single baud rate.

SUMMARY

In some implementations, an optical system may include a transmitter configured to receive information associated with a modulation format and a baud rate for transmission of an optical signal, and generate optical signals based on the modulation format and the baud rate. The optical system may also include a quadrature-delay-interferometer detector configured to receive the information associated with the modulation format and the baud rate, receive the optical signals, and generate quadrature-delay-interferometer signals based on the optical signals, the modulation format, and the baud rate. The optical system may further include a controller configured to supply control signals to the transmitter, where the transmitter generates a particular optical signal having a particular wavelength based on the control signals, and the particular optical signal have the modulation format and the baud rate. The controller may be further configured to selectively control the particular wavelength of the particular optical signal, such that a point of the quadrature-delay-interferometer signals is associated with the particular wavelength of the particular optical signal.

In some implementations, an optical system may include an optical transmitter, a quadrature-delay-interferometer detector, and a controller. The controller may be configured to receive a modulation format and a baud rate for transmission of an optical signal, and instruct the optical transmitter to generate optical signals based on the modulation format and the baud rate. The controller may be further configured to instruct the quadrature-delay-interferometer detector to generate quadrature-delay-interferometer signals based on the optical signals, the modulation format, and the baud rate, and supply control signals to the optical transmitter. The optical transmitter may generate, based on the control signals, a particular optical signal having a particular wavelength, and the particular optical signal may include the modulation format and the baud rate. The controller may be further configured to determine whether the particular optical signal intersects a peak or a trough of the quadrature-delay-interferometer signals, and selectively control the optical transmitter to lock or adjust the particular wavelength of the particular optical signal for the modulation format and the baud rate based on whether the particular optical signal intersects a peak or a trough of the quadrature-delay-interferometer signals.

In some implementations, a method, may include: receiving, by a device, a modulation format and a baud rate for transmission of an optical signal; generating, by the device, optical signals based on the modulation format and the baud rate; generating, by the device, quadrature-delay-interferometer signals based on the optical signal, the modulation format, and the baud rate; generating, by the device, a particular optical signal with a particular wavelength for the modulation format and the baud rate; determining, by the device, whether a point of the quadrature-delay-interferometer signals is associated with the particular wavelength of the particular optical signal; and setting or adjusting, by the device, the particular wavelength of the particular optical signal for the modulation format and the baud rate based on whether a point of the quadrature-delay-interferometer signals is associated with the particular wavelength of the particular optical signal.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is a diagram of example components of a transmitter controller depicted in FIG. 2;

FIG. 6 is a flow chart of an example process for controlling an optical transmitter that supports multiple modulation formats and/or baud rates; and FIGS. 7A-7G are diagrams of an example relating to the example process shown in FIG. 6.

DETAILED DESCRIPTION

The following detailed description refers to the accompanying drawings. The same reference numbers in different drawings may identify the same or similar elements.

Figure 1:
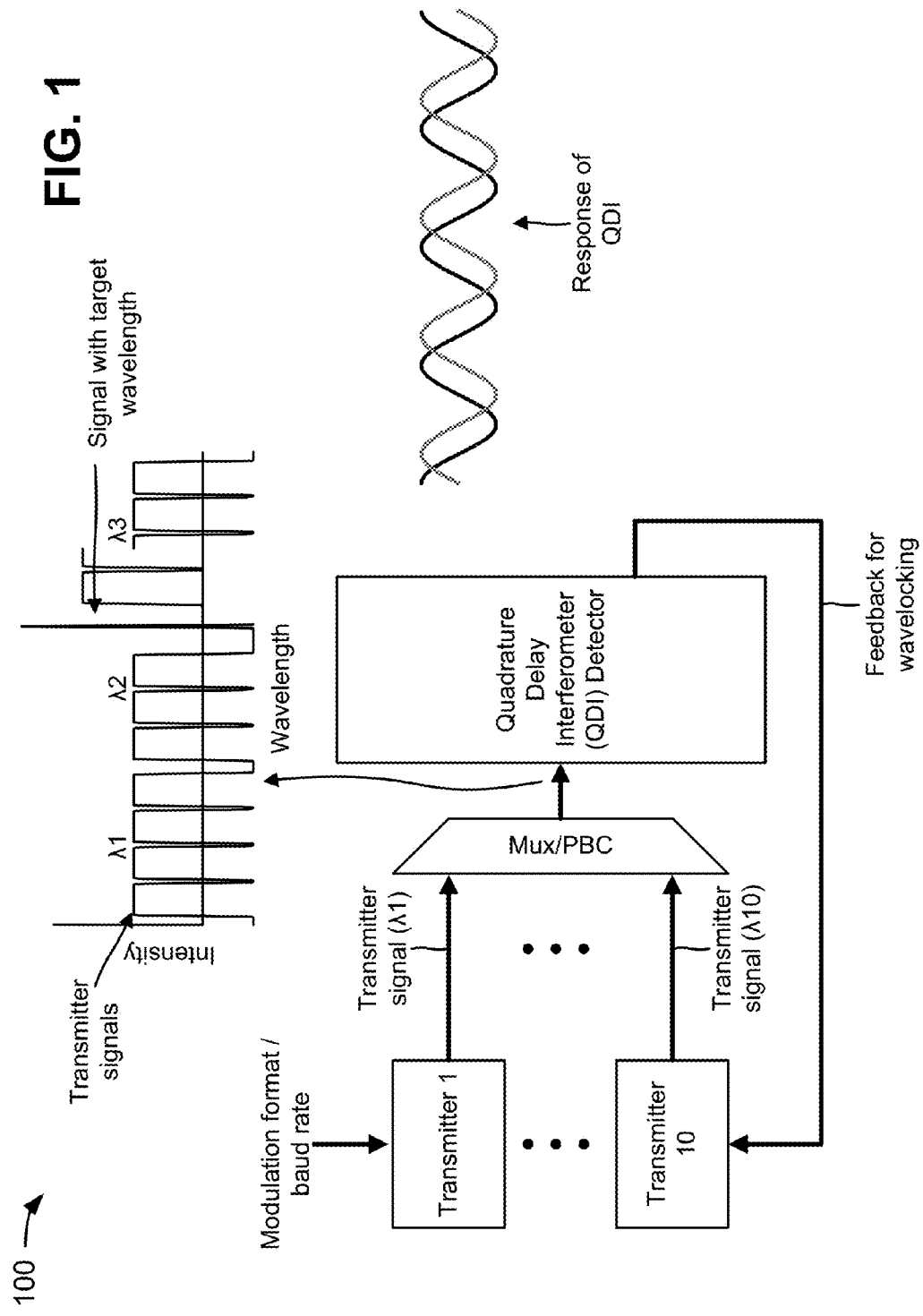
FIG. 1 is a diagram of an overview of an example implementation described herein.

FIG. 1 is a diagram of an overview of an example implementation 100 described herein. As shown in FIG. 1, multiple transmitters may transmit multiple optical signals, of different wavelengths, that are combined onto a single optical fiber. Each transmitter may transmit an optical transmitter signal at a particular wavelength that is different than wavelengths transmitted by the other transmitters. For example, a first transmitter may transmit a first transmitter signal at a first wavelength ($\lambda 1$), a second transmitter may transmit a second transmitter signal at a second wavelength ($\lambda 2$) that is different than the first wavelength, etc.

In some implementations, the transmitters may support communications over a number of wavelength channels. For example, the transmitters of FIG. 1 may support ten channels over a particular wavelength range (e.g., a two-hundred gigahertz (GHz) range). In some implementations, each transmitter may provide multiple subcarrier signals, which are independent signals transmitted by the same transmitter. In some implementations, the transmitters may enable a user of the transmitters to select a particular modulation format (e.g., QPSK, 8-QAM, 16-QAM, etc.) and a particular baud rate (e.g., in gigabaud (GBd)) for the transmitter signals. The transmitters may change the channel spacing of the transmitter signals based on the particular modulation format and baud rate selected by the user.

As further shown in FIG. 1, in order to change the channel spacing of the transmitter signals, a quadrature delay interferometer (QDI) detector may be provided with the transmitters. The QDI detector may be used as a stable reference for signals that include different frequency grids for different modulation formats and baud rates. As shown in FIG. 1, a selected modulation format and baud rate may be provided to the transmitters and the QDI detector. The transmitters may generate ten transmitter signals at different wavelengths based on the modulation format and the baud rate. The QDI detector may generate QDI signals based on the transmitter signals, the modulation format, and the baud rate. The output of the QDI signals may be analyzed, as shown in FIG. 1. As further shown in FIG. 1, each of the ten transmitters may generate four subcarrier signals (e.g., four square peaks) at a particular wavelength. The QDI signals may include signals with peaks and troughs.

In some implementations, the QDI signals may be utilized to control and/or lock the wavelengths of the transmitter signals (e.g., referred to herein as wavelocking). For example, a particular transmitter may generate a particular transmitter signal with a target wavelength (e.g., shown as a spike in FIG. 1), and the particular transmitter signal may be compared to the peaks and troughs of the QDI signals in order to provide wavelength control at different modulation formats and/or baud rates. If a peak of the particular transmitter signal aligns with a peak or a trough of the QDI signals, the target wavelength of the particular transmitter signal may be determined to be correct. Based on this determination, the target wavelength of the particular transmitter signal may be locked or set. If the peak of the particular transmitter signal does not align with a peak or a trough of the QDI signals, the target wavelength of the particular transmitter signal may be determined to be incorrect. Based on this determination, the target wavelength of the particular transmitter signal may be adjusted until the peak of the particular transmitter signal aligns with a peak or a trough of the QDI signals. As shown in FIG. 1, such determinations may be provided, as feedback for wavelocking, to the transmitters of the optical transmitter. As shown in FIG. 1, a peak of a transmitter signal with a target wavelength may align with a trough of one of the QDI signals. Thus, the target wavelength of the transmitter signal may be locked.

Systems and/or methods described herein may provide control of optical transmitters that can be dynamically configured to different modulation formats and/or baud rates. The systems and/or methods may enable wavelength channel spacing to be altered based on a selected modulation format and/or baud rate. The systems and/or methods may also enable the optical transmitters to provide multiple subcarrier signals. The systems and/or methods may enable wavelengths of optical transmitters to be accurately determined and locked, which may enable the channel spacing of the transmitter signals to be accurately aligned.

Figure 2:
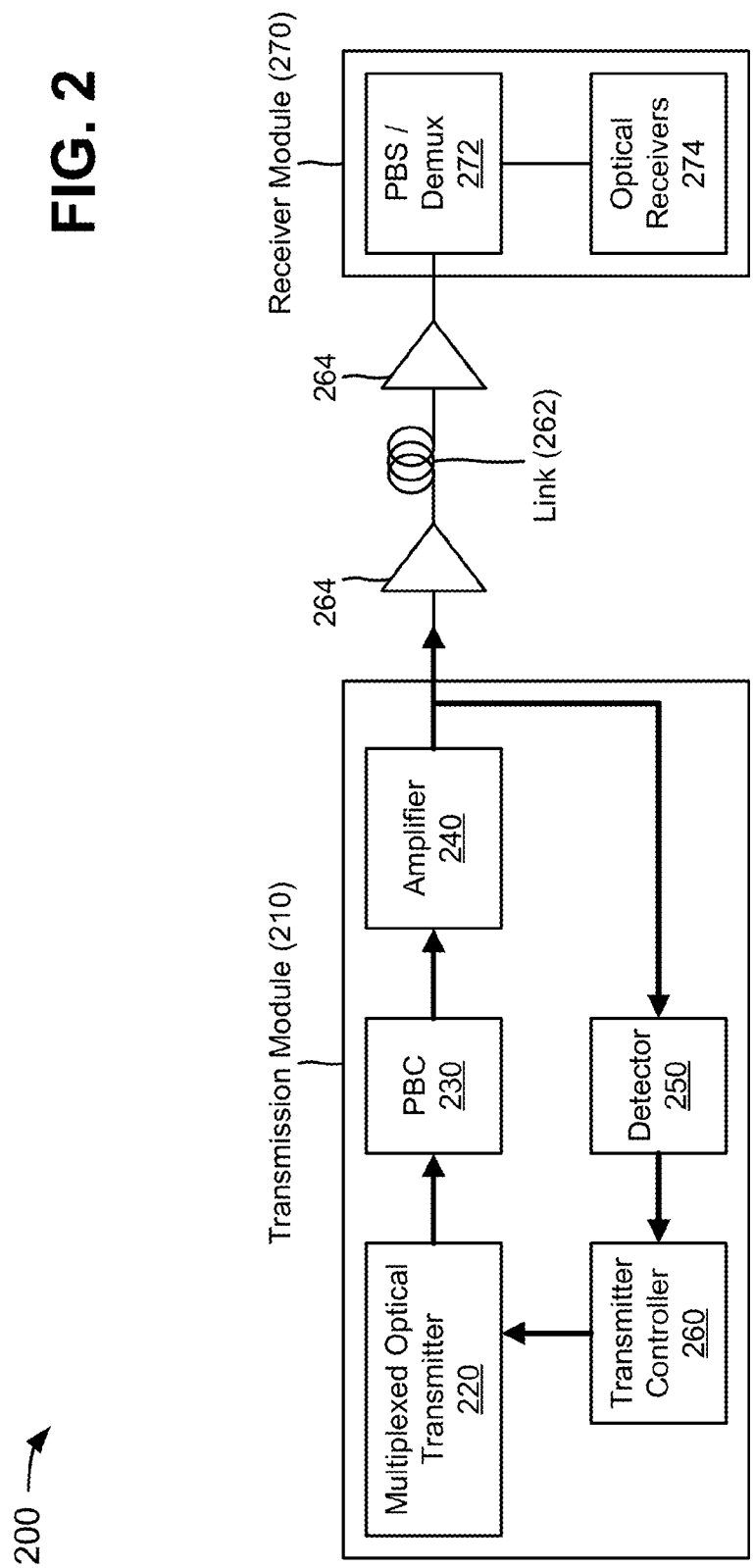
FIG. 2 is a diagram of an example environment in which systems and/or methods described herein may be implemented.

FIG. 2 is a diagram of an example environment 200 in which systems and/or methods described herein may be implemented. As illustrated, environment 200 may include a transmitter (Tx) module 210 and a receiver (Rx) module 270. In some implementations, transmitter module 210 may be optically connected to receiver module 270 via link 262, and/or optical amplifiers 264. Link 262 may include one or more optical amplifiers 264 that amplify an optical signal as the optical signal is transmitted over link 262.

Transmitter module 210 may include one or more devices that generate, process, and/or transmit an optical signal to be received by receiver module 270. In some implementations, transmitter module 210 may enable a user of transmitter module 210 to set a modulation format and/or baud rate for optical signal based on a distance provided between transmitter module 210 and receiver module 270 and/or a desired spectral efficiency. For example, if the distance between transmitter module 210 and receiver module 270 is less than or equal to five-hundred (500) kilometers (km), the user may select a 16-QAM modulation format (e.g., a spectrally efficient format) and a 16.5 GBd baud rate since such a modulation format and baud rate may transmit optical signals up to 500 km. In another example, if the distance between transmitter module 210 and receiver module 270 is greater than 500 km and less than or equal to one-thousand five-hundred (1,500) km, the user may select an 8-QAM modulation format (e.g., a less spectrally efficient format) and a 22 GBd baud rate since such a modulation format and baud rate may transmit optical signals up to 1,500 km. In still another example, if the distance between transmitter module 210 and receiver module 270 is greater than 1,500 km and less than or equal to forty-thousand (40,000) km, the user may select a QPSK modulation format (e.g., an even less spectrally efficient format) and a 33 GBd baud rate since such a modulation format and baud rate may transmit optical signals up to 40,000 km.

As shown in FIG. 2, transmitter module 210 may include a multiplexed optical transmitter 220, a polarization beam combiner (PBC) 230, an amplifier 240, a detector 250, and a transmitter controller 260.

Multiplexed optical transmitter 220 may include one or more devices that generate, process, and/or transmit optical signals. In some implementations, multiplexed optical transmitter 220 may generate optical signals for transmission to PBC 230. In some implementations, multiplexed optical transmitter 220 may modulate the optical signals (e.g., according to a modulation format) based on input signals provided by transmitter controller 260. The input signals may include a signal instructing multiplexed optical transmitter 220 to lock one or more wavelengths of the optical signals and/or a signal instructing multiplexed optical transmitter 220 to adjust one or more wavelengths of the optical signals. In some implementations, multiplexed optical transmitter 220 may multiplex the modulated optical signals (e.g., using wavelength-division multiplexing (WDM) techniques).

PBC 230 may include one or more devices that receive optical signals from multiplexed optical transmitter 220 and combine the received optical signals into an optical signal for output. In some implementations, PBC 230 may receive optical signals from multiplexed optical transmitter 220, and may combine one or more of the optical signals into an optical signal with a dual polarization. PBC 230 may output, to amplifier 240, the optical signal with the dual polarization. In some implementations, PBC 230 may be omitted if a modulation format of multiplexed optical transmitter 220 is not polarization multiplexed.

Amplifier 240 may include a device that increases an amplitude and/or power level of a received optical signal, while maintaining characteristics of the optical signal (e.g., a wavelength, a bandwidth, a polarization, a phase, etc.). Amplifier 240 may receive the optical signal from PBC 230, and may amplify the optical signal to an amplitude that is greater than a particular threshold. Amplifier 240 may output the amplified optical signal to detector 250 and/or receiver module 270.

Detector 250 may include one or more devices that detect an optical signal and output an electrical signal based on the detected optical signal. Detector 250 may, for example, output an electrical signal based on all or a portion of wavelengths included within the detected optical signal. In some implementations, detector 250 may include a photo detector that detects an optical signal and outputs the electrical signal based on all or the portion of wavelengths associated with the optical signal. In some implementations, detector 250 may output another electrical signal based on a filtered version of the detected optical signal.

In some implementations, detector 250 may include a quadrature delay interferometer (QDI) interferometer device that determines a frequency response on which wavelengths, associated with channels used for transmitting optical signals, are based. The frequency response may, for example, enable detector 250 to act as a stable reference on which wavelengths, of optical signals transmitted by multiplexed optical transmitter 220, may be calibrated and/or tuned. The frequency response may be represented by a transfer function that is based on, for example, wavelengths and respective quantities of attenuation or gain. The transfer function, when acting as a stable reference, may not change by an amount that is greater than a particular threshold over a period of time and/or may not change in varying conditions (e.g., associated with temperature, humidity, etc.). Detector 250 may output the other electrical signal based on the detected optical signal and the frequency response associated with the QDI device.

In some implementations, the QDI device may include a delay in one arm, and may generate a sinusoidal filter versus frequency. In such implementations, the QDI device may generate a response to a single wavelength of an optical signal according to:

$$I_{PD} \propto 1+\sin(2\pi \cdot f_{CW} \cdot \tau) \qquad (1),$$

where $I_{PD}$ refers to a photocurrent (e.g., in milliamps (mA)) of a QDI signal, $f_{CW}$ refers to a frequency or a wavelength of the optical signal, and $\tau$ refers to a difference (e.g., a delay) in propagation times between the arms of the QDI device.

In some implementations, the QDI device may include two photodiodes (e.g., one on each output of the QDI device) that provide a differential measurement of photocurrent. In such implementations, a difference between the measurements of the two photodiodes ($\Delta I_{PD}$) may be provided by:

$$\Delta I_{PD} \propto \sin(2\pi \cdot f_{CW} \cdot \tau) \qquad (2).$$

By changing the delay in the QDI device by one quarter of a wave period (e.g., ninety degrees), a complementary observation can be made as follows:

$$\Delta I'_{PD} \propto \sin(2\pi \cdot f_{CW} \cdot [\tau+\Delta\tau])=\cos(2\pi \cdot f_{CW} \cdot \tau) \qquad (3).$$

Equations (2) and (3) may be used to provide a wavelength of the optical signal, with an ambiguity (n) of the QDI device, according to the following:

$$f_{CW} = \frac{\arctan(I_{PD}/I'_{PD})}{2\pi\tau} + \frac{n}{\tau}. \qquad (4)$$

Transmitter controller 260 may include one or more devices that provide, to one or more devices within transmitter module 210, signals that control conditions associated with an optical signal generated by transmitter module 210. In some implementations, transmitter controller 260 may be separate from and external to transmitter module 210. In some implementations, transmitter controller 260 may monitor and/or control optical signals generated by multiplexed optical transmitter 220, and may enable a user to select a modulation format and/or a baud rate for the optical signals generated by multiplexed optical transmitter 220.

In some implementations, transmitter controller 260 may receive, from detector 250, a condition associated with an optical signal to be transmitted by transmitter module 210 to receiver 270. Based on the condition, transmitter controller 260 may instruct multiplexed optical transmitter 220 to adjust one or more transmission parameters, associated with the optical signal, that cause the condition to be remedied. For example, transmitter controller 260 may, for example, instruct multiplexed optical transmitter 220 to increase or decrease a wavelength of the optical signal so that the optical signal may be wavelocked. In some implementations, transmitter controller 260 may instruct multiplexed optical transmitter 220 to increase or decrease a power level associated with the optical signal in order to remedy conditions associated with in-phase/quadrature phase (I/Q) gain imbalance, polarization gain imbalance, etc. In some implementations, transmitter controller 260 may instruct multiplexed optical transmitter 220 to increase or decrease a Mach-Zehnder Modulator bias point in order to remedy a condition associated with quadrature error. In some implementations, transmitter controller 260 may instruct multiplexed optical transmitter 220 to increase or decrease a Mach-Zehnder Modulator bias point in order to remedy a condition associated with sub-Mach-Zehnder bias error. In some implementations, transmitter controller 260 may instruct multiplexed optical transmitter 220 to increase or decrease the timing of the transmit lanes in order to remedy a condition associated with delay error.

In some implementations, multiplexed optical transmitter 220 may include a digital signal processor (DSP) and a digital-to-analog converter (DAC). In some implementations, the DSP and the DAC may be implemented on a single integrated circuit, such as an application-specific integrated circuit (ASIC). The DSP may include a digital signal processor or a collection of digital signal processors. In some implementations, the DSP may receive a signal, process the signal, and output digital signals having symbols that represent components of the signal. In some implementations, the DSP may digitally modulate the signal by mapping bits, associated with the signal, to the symbols. In some implementations, the DSP may digitally modulate the signal using a particular modulation format (e.g., the QPSK modulation format, the QAM modulation format, or some other modulation format). In some implementations, the DSP may apply spectral shaping and/or perform filtering to the signal. The DAC may include a signal converting device or a collection of signal converting devices. In some implementations, the DAC may receive the digital signal from the DSP, convert the received digital signals to analog signals, and provide the analog signals to a modulator associated with multiplexed optical transmitter 220. The analog signals may correspond to electrical signals (e.g., voltages) to drive the modulator.

Receiver module 270 may include one or more devices that receive an optical signal from transmitter module 210, and/or process the optical signal. In some implementations, receiver module 270 may be a coherent optical receiver. In some implementations, receiver module 270 may receive the optical signal, and may demultiplex the optical signal (e.g., using one or more demultiplexers and/or wave-division demultiplexing techniques) to create one or more optical signals. In some implementations, receiver module 270 may demodulate the optical signals (e.g., using one or more demodulators) and/or may remove symbols associated with control sequences, that were inserted into optical signal by multiplexed optical transmitter 220, to recover one or more electrical signals. In some implementations, receiver module 270 may transmit the one or more electrical signals to one or more other devices.

As shown in FIG. 2, receiver module 270 may include a polarization beam splitter (PBS)/demultiplexer 272 and optical receivers 274. In some implementations, PBS/demultiplexer 272 may receive an optical signal from transmitter module 210, and may split the optical signal into one or more signal channels. In some implementations, the PBS may be omitted if a modulation format of the optical signal is not polarization multiplexed. In some implementations, PBS/demultiplexer 272 may supply signal channels to optical receivers 274 via waveguides. The waveguides may include optical links that transmit outputs of PBS/demultiplexer 272 to optical receivers 274. In some implementations, each optical receiver 274 may receive outputs via a single waveguide or via multiple waveguides.

Each optical receiver 274 may convert an input optical signal to an electrical signal that represents the transmitted data. In some implementations, each optical receiver 274 may include one or more photodetectors and/or related devices to receive respective input optical signals outputted by demultiplexer 272 and a local oscillator, convert the signals to a photocurrent, and provide a voltage output to function as an electrical signal representation of the original input signal.

The number of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
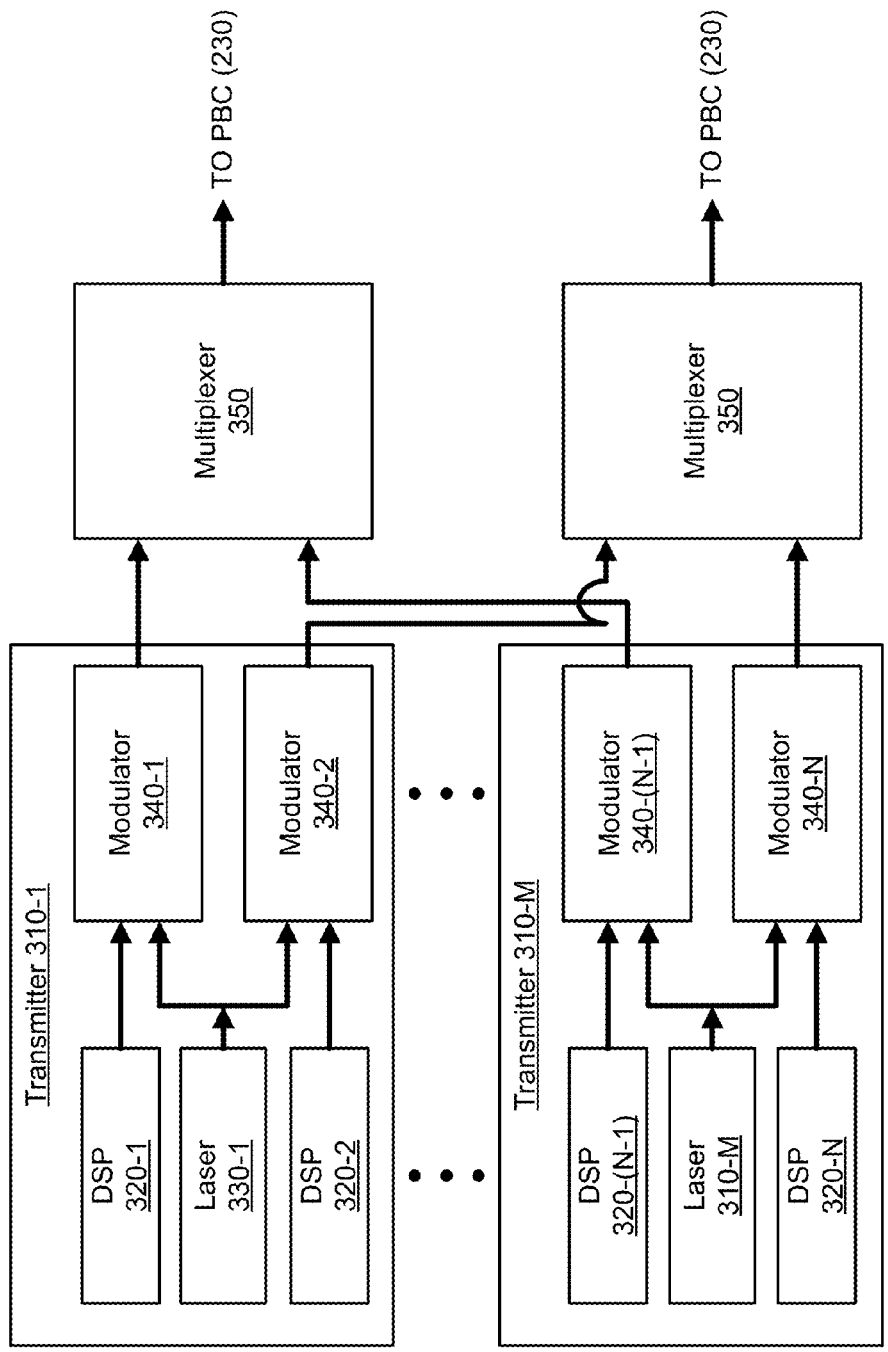
FIG. 3 is a diagram of example components of an optical transmitter depicted in FIG. 2.

FIG. 3 is a diagram of example components of multiplexed optical transmitter 220 (FIG. 2). As shown, multiplexed optical transmitter 220 may include a group of transmitters 310-1, . . . , 310-M (where M≥1) (hereinafter referred to collectively as "transmitters 310" and, in some instances, individually as "transmitter 310"), a group of digital signal processors and digital-to-analog converters 320-1, . . . , 320-N (where N≥1) (hereinafter referred to collectively as "DSPs 320" and, in some instances, individually as "DSP 320"), a group of lasers 330-1, . . . , 330-M (where M≥1) (hereinafter referred to collectively as "lasers 330" and, in some instances, individually as "laser 330"), a group of modulators 340-1, . . . , 340-N (where N≥1) (hereinafter referred to collectively as "modulators 340" and, in some instances, individually as "modulator 340"), and a pair of multiplexers 350.

Transmitter 310 may include one or more components that generate an optical signal that is outputted to multiplexer 350. DSP 320 may include a digital signal processor or a collection of digital signal processors. In some implementations, DSP 320 may receive a signal, process the signal, and output digital signals having symbols that represent components of the signal. In some implementations, DSP 320 may digitally modulate the signal by mapping bits, associated with the signal, to the symbols. In some implementations, DSP 320 may digitally modulate the signal using a particular modulation format (e.g., the QPSK modulation format, the QAM modulation format, or some other modulation format). In some implementations, DSP 320 may apply spectral shaping and/or perform filtering to the signal.

Laser 330 may include one or more components that generate an optical signal that is outputted to modulator 340. In some implementations, laser 330 may tune and/or calibrate optical signal based on an instruction received from transmitter controller 260 (FIG. 2). In some implementations, laser 330 may increase or decrease a wavelength of the optical signal in order to enable a condition, associated with the optical signal, to be remedied or mitigated.

In some implementations, each DSP 320 may receive a data channel (TxCh1 through TxChN), encode the signal, and send the encoded signal to modulator 340. In some implementations, transmitter module 210 may include 5, 10, 20, 50, 100, or some other number of lasers 330. Each laser 330 may be tuned to use an optical carrier of a designated wavelength. In some implementations, a grid of wavelengths emitted by lasers 330 may conform to a known standard, such as a standard published by the Telecommunication Standardization Sector (ITU-T).

In some implementations, each laser 330 may include a semiconductor optical amplifier (SOA) and/or some other components. The laser and/or SOA may be coupled with a tuning element (e.g., a heater) that can be used to tune the wavelength of an optical signal channel output by the laser or SOA. In some implementations, a single laser may be shared by multiple modulators 340.

Modulator 340 may include one or more components that modulate an optical signal received from laser 330 using signals from DSP 320. In some implementations, modulator 340 may receive an optical signal from laser 330, and may modulate a first component of the optical signal (e.g., a first polarization) using a signal received from DSP 320. Modulator 340 may modulate the first component of the optical signal to create a modulated optical signal associated with the first polarization. In some implementations, modulator 340 may modulate the optical signal using a modulation format (e.g., QPSK, 8-QAM, 16-QAM, etc.) selected by a user and provided by transmitter controller 260 to DSP 320. In some implementations, modulator 340 may provide the modulated first component of the optical signal to a first multiplexer 350. Another modulator 340 may, in the manner described above, modulate a second component of the optical signal (e.g., a second polarization), and may provide the modulated second component of the optical signal to a second multiplexer 350.

In some implementations, modulator 340 may increase or decrease a quadrature angle, associated with a real and/or imaginary component of the optical signal, based on an instruction received from transmitter controller 260. In some implementations, modulator 340 may adjust a phase angle associated with one or more phase modulation states, such as one or more of the four states associated with QPSK techniques, based on an instruction received from transmitter controller 260.

Multiplexer 350 may include one or more components that multiplex optical signals received from one or more modulators 340. In some implementations, a first multiplexer 350 may multiplex one or more modulated first components of optical signals received from a first set of modulators 340 (e.g., using WDM techniques) into a single first optical signal with multiple wavelengths. In some implementations, each of the modulated first components may correspond to a respective one of the wavelengths. The first multiplexer 350 may provide the single first optical signal to PBC 230. In some implementations, a second multiplexer 350 may, as described above, multiplex one or more modulated second components of optical signals received from a second set of modulators 340 into a single second optical signal, and may provide the single second optical signal to PBC 230.

In some implementations, multiplexer 350 may include an arrayed waveguide grating (AWG) or some other multiplexing device. In some implementations, multiplexer 350 may combine multiple signal channels, associated with transmitters 310, into an optical signal, such as a wave division multiplexed (WDM) signal.

In some implementations, a photonic integrated circuit (PIC) may include components, arranged on a common substrate, such as a laser (e.g., laser 330) associated with a particular wavelength, a modulator (e.g., modulator 340) configured to modulate the output of the laser, and a multiplexer (e.g., multiplexer 350) to combine each of the modulated outputs (e.g., to form a combined output or WDM signal).

The number of components shown in FIG. 3 is provided as an example. In practice, multiplexed optical transmitter 220 may include additional components, fewer components, different components, or differently arranged components than those shown in FIG. 3. Additionally, or alternatively, one or more components of multiplexed optical transmitter 220 may perform one or more functions described as being performed by another one or more components of multiplexed optical transmitter 220.

Figure 4:
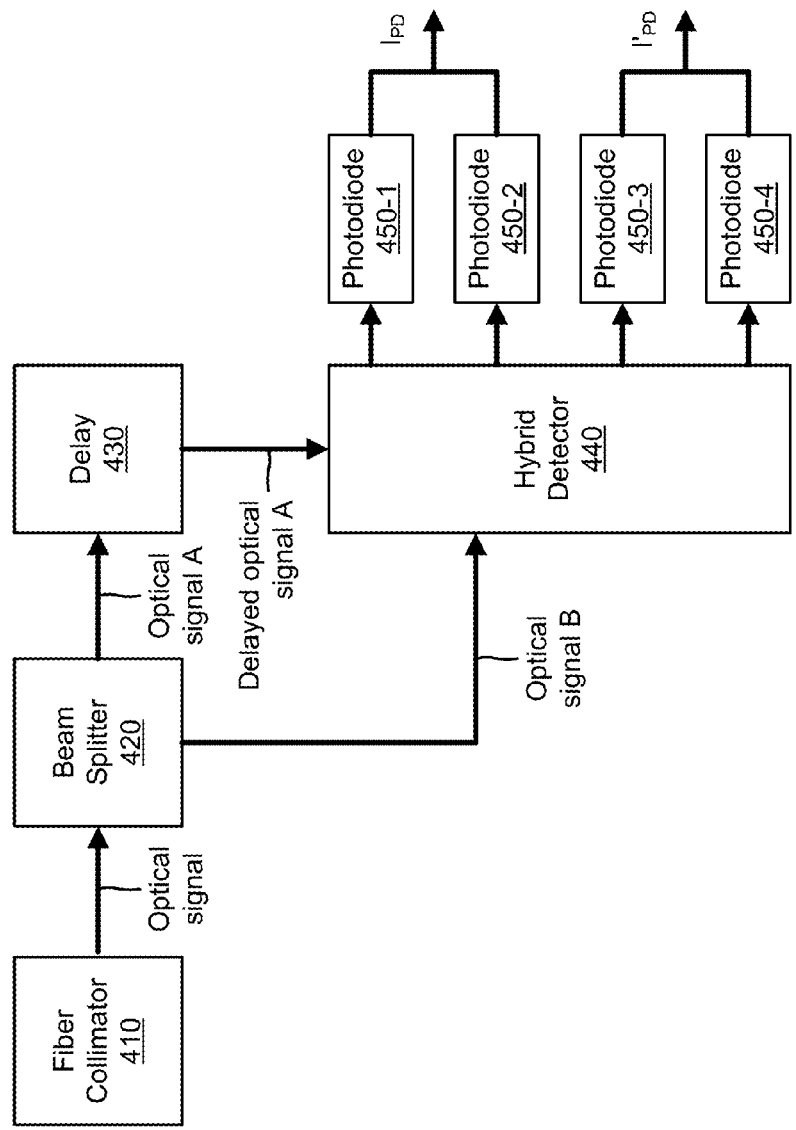
FIG. 4 is a diagram of example components of a detector depicted in FIG. 2.

FIG. 4 is a diagram of example components of quadrature delay interferometer detector 250 (FIG. 2). As shown, detector 250 may include a fiber collimator 410, a beam splitter 420, a delay 430, a hybrid detector 440, and four photodiodes 450-1 through 450-4 (hereinafter referred to collectively as "photodiodes 450" and, in some instances, individually as "photodiode 450").

Fiber collimator 410 may include one or more components that cause optical signal to be more aligned in a specific direction (e.g., collimated or parallel). In some implementations, fiber collimator 410 may receive the optical signal from amplifier 240 (FIG. 2), and may cause the optical signal to be more aligned in a collimated or parallel direction. Fiber collimator 410 may provide the aligned optical signal to beam splitter 420. In some implementations, fiber collimator 410 may include a curved mirror or a lens.

Beam splitter 420 may include one or more components that split an optical signal into two optical signals. In some implementations, beam splitter 420 may receive the aligned optical signal from fiber collimator 410, and may split the aligned optical signal into two optical signals. In some implementations, beam splitter 420 may split the optical signal received from fiber collimator 410 into unequal or equal portions. For example, as shown in FIG. 4, beam splitter 420 may provide half (50%) of the remaining optical signal (shown as optical signal A) to delay 430, and may provide half (50%) of the remaining optical signal (shown as optical signal B) to hybrid detector 440.

Delay 430 may include one or more components that apply a delay ($\tau$) to optical signal A, received from beam splitter 420, to generate a delayed optical signal A. In some implementations, delay 430 may apply a particular time delay (e.g., in picoseconds, milliseconds, etc.) to optical signal A. Delay 430 may provide the delayed optical signal A to hybrid detector 440.

Hybrid detector 440 may include one or more components that receive the delayed optical signal A from delay 430 and optical signal B from beam splitter 420. In some implementations, hybrid detector 440 may illuminate photodiode 450-1 with a sum of the delayed optical signal A and optical signal B (e.g., A+B), where A and B represent electrical field magnitude of the optical signals. In some implementations, photodiode 450-1 may output a photocurrent equal to a square of the sum (e.g., $(A+B)^2$). In some implementations, hybrid detector 440 may illuminate photodiode 450-2 with a difference of the delayed optical signal A and optical signal B (e.g., A−B). In some implementations, the photodiode 450-2 may output a photocurrent equal to a square of the difference (e.g., $(A-B)^2$).

In some implementations, hybrid detector 440 may change optical signal B by one quarter of a wave period (e.g., ninety degrees). In such implementations, hybrid detector 440 may illuminate photodiode 450-3 with a sum of the delayed optical signal A and the changed optical signal B (e.g., A+B'). In some implementations, photodiode 450-3 may output a photocurrent equal to a square of the sum (e.g., $(A+B')^2$. In some implementations, hybrid detector 440 may illuminate photodiode 450-4 with a difference of the delayed optical signal A and the changed optical signal B (e.g., (A−B')). In some implementations, photodiode 450-4 may output a photocurrent equal to a square of the difference (e.g., $(A-B')^2$).

In some implementations, hybrid detector 440 may include a quadrature (or ninety degree) coupler, such as, for example, a Multimode Interferometer coupler, 4-by-4 hybrid coupler, or cascaded splitters. In some implementations, the quadrature coupler may split an input signal into four signals (e.g., with equal magnitudes) with the phase of photodiode 450-2 differing from that of photodiode 450-1 by 180 degrees; with the phase of photodiode 450-4 differing from that of photodiode 450-3 by 180 degrees; and with the phase of photodiode 450-3 differing from that of photodiode 450-1 by 90 degrees.

Photodiode 450 may include one or more components that receive an optical signal, and convert the optical signal into an electrical signal (e.g., by generating an electrical current proportional to the power of incident optical radiation). In some implementations, photodiode 450 may include a semiconductor positive-intrinsic-negative (PIN) photodiode, an avalanche photodiode (APD), etc. Photodiode 450 may provide the electrical signal to transmitter controller 260 (FIG. 2). In some implementations, each of photodiodes 450 may provide different electrical signals to transmitter controller 260. For example, photodiode 450-1 may output the squared sum of the delayed optical signal A and optical signal B (e.g., $(A+B)^2$) as a first electrical signal. In another example, photodiode 450-2 may output the squared difference of the delayed optical signal A and optical signal B (e.g., $(A-B)^2$) as a second electrical signal. The first electrical signal of photodiode 450-1 and the second electrical signal of photodiode 450-2 may be combined to generate a first QDI signal ($I_{PD}$), and the first QDI signal may be provided to transmitter controller 260. In some implementations, transmitter controller will detect the signal using an analog-to-digital converter (ADC).

In another example, photodiode 450-3 may output the squared sum of the delayed optical signal A and the changed optical signal B (e.g., $(A+B')^2$) as a third electrical signal. In another example, photodiode 450-4 may output the squared difference of the delayed optical signal A and the changed optical signal B (e.g., $(A-B')^2$) as a fourth electrical signal. The third electrical signal of photodiode 450-2 and the fourth electrical signal of photodiode 450-4 may be combined to generate a second QDI signal ($I'_{PD}$), and the second QDI signal may be provided to transmitter controller 260. In some implementations, transmitter controller will detect the signal using an analog-to-digital converter (ADC).

The number of components shown in FIG. 4 is provided as an example. In practice, detector 250 may include additional components, fewer components, different components, or differently arranged components than those shown in FIG. 4. Additionally, or alternatively, one or more components of detector 250 may perform one or more functions described as being performed by another one or more components of detector 250.

FIG. 5 is a diagram of example components of a device 500 that may correspond to transmitter controller 260 (FIG. 2). In some implementations, transmitter controller 260 may include one or more devices 500 or one or more components of device 500. As shown in FIG. 5, device 500 may include a bus 510, a processor 520, a memory 530, an input component 540, an output component 550, and a communication interface 560.

Bus 510 may include a path that permits communication among the components of device 500. Processor 520 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 520 may include multiple processor cores for parallel computing. Memory 530 may include a random access memory (RAM), a read only memory (ROM), and/or another type of dynamic or static storage component (e.g., a flash, magnetic, or optical memory) that stores information and/or instructions for use by processor 520.

Input component 540 may include a component that permits a user to input information to device 500 (e.g., a touch screen display, a keyboard, a keypad, a mouse, a button, a switch, a command-line interface, a web interface, etc.). Output component 550 may include a component that outputs information from device 500 (e.g., a display, a speaker, one or more light-emitting diodes (LEDs), a command-line interface, a web interface, etc.).

Communication interface 560 may include a transceiver-like component, such as a transceiver and/or a separate receiver and transmitter, which enables device 500 to communicate with other devices, such as via a wired connection, a wireless connection, or a combination of wired and wireless connections. For example, communication interface 560 may include an Ethernet interface, an optical interface, a coaxial interface, an infrared interface, a radio frequency (RF) interface, a serial interface such as RS-232, a universal serial bus (USB) interface, a high-definition multimedia interface (HDMI), or the like.

Device 500 may perform various operations described herein. Device 500 may perform these operations in response to processor 520 executing software instructions included in a computer-readable medium, such as memory 530. A computer-readable medium is defined as a non-transitory memory device. A memory device includes memory space within a single physical storage device or memory space spread across multiple physical storage devices.

Software instructions may be read into memory 530 from another computer-readable medium or from another device via communication interface 560. When executed, software instructions stored in memory 530 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 5 is provided as an example. In practice, device 500 may include additional components, fewer components, different components, or differently arranged components than those shown in FIG. 5. Additionally, or alternatively, one or more components of device 500 may perform one or more functions described as being performed by another one or more components of device 500.

FIG. 6 is a flow chart of an example process 600 for controlling an optical transmitter that supports multiple modulation formats and/or baud rates. In some implementations, one or more process blocks of FIG. 6 may be performed by transmitter module 210. In some implementations, one or more process blocks of FIG. 6 may be performed by another device or a group of devices separate from or including transmitter module 210.

As shown in FIG. 6, process 600 may include receiving a modulation format and a baud rate for a transmitter (block 610). For example, a user may utilize transmitter module 210 for providing optical signals along an optical fiber to receiver module 270. In some implementations, the user may determine a modulation format and/or a baud rate for transmitter module 210 based on a length of optical fiber and/or a desired spectral efficiency. For example, if the length of the optical fiber is less than or equal to 500 km, the user may select a 16-QAM modulation format and a 16.5 GBd baud rate. If the length of the optical fiber is greater than 500 km and less than or equal to one-thousand 1,500 km, the user may select an 8-QAM modulation format and a 22 GBd baud rate. If the length of the optical fiber is greater than 1,500 km and less than or equal to 40,000 km, the user may select a QPSK modulation format and a 33 GBd baud rate. In some implementations, the user may select a modulation format and an approximate baud rate or a range of baud rates for the selected modulation format.

In some implementations, the user may provide, to transmitter module 210, the modulation format and/or the baud rate for transmitter module 210, and transmitter module 210 (e.g., transmitter controller 260) may receive the modulation format and/or the baud rate. In some implementations, transmitter controller 260 may include or be associated with a user interface that enables the user to input the modulation format and/or the baud rate. In some implementations, the user interface may request additional information from the user, such as, for example, positions of wavelength channels of transmitter module 210, a number of wavelength channels, etc.

In some implementations, transmitter controller 260 may automatically determine the modulation format and/or the baud rate for transmitter module 210. For example, transmitter controller 260 may instruct transmitter module 210 to send an optical signal to receiver module 270, and may measure a transmission time associated with the optical signal. Transmitter controller 260 may determine the length of the optical fiber based on the transmission time, and may select the modulation format and/or the baud rate based on the determined length of the optical fiber.

As further shown in FIG. 6, process 600 may include generating signals with the transmitter based on the modulation format and the baud rate (block 620). For example, transmitter controller 260 may instruct one or more transmitters 310 of multiplexed optical transmitter 220 to generate an optical signal based on the modulation format and the baud rate provided by the user. In some implementations, each of the one or more transmitters 310 may transmit an optical transmitter signal at a particular wavelength that is different than wavelengths transmitted by the other transmitters 310. In some implementations, multiplexed optical transmitter 220 may support communications over a number of wavelength channels. For example, multiplexed optical transmitter 220 may support multiple channels over a particular wavelength range (e.g., a 200 GHz range).

In some implementations, transmitter controller 260 may instruct optical transmitter 220 to change the channel spacing of the transmitter signals based on the modulation format and the baud rate provided by the user. For example, if the user provided a 16-QAM modulation format and a 16.5 GBd baud rate, transmitter controller 260 may instruct multiplexed optical transmitter 220 to set the channel spacing of the transmitter signals to 19 GHz. If the user provided an 8-QAM modulation format and a 22 GBd baud rate, transmitter controller 260 may instruct multiplexed optical transmitter 220 to set the channel spacing of the transmitter signals to 25 GHz. If the user provided a QPSK modulation format and a 33 GBd baud rate, transmitter controller 260 may instruct multiplexed optical transmitter 220 to set the channel spacing of the transmitter signals to 38 GHz.

As further shown in FIG. 6, process 600 may include generating QDI signals based on the modulation format, the baud rate, and the transmitter signals (block 630). For example, detector 250 may receive the optical signal (e.g., with the multiple transmitter signals) from multiplexed optical transmitter 220, and may generate QDI signals based on the modulation format and the baud rate provided by the user. In some implementations, detector 250 may periodically or continuously sample the optical signal generated by multiplexed optical transmitter 220. For example, detector 250 may sample the optical signal generated by multiplexed optical transmitter 220 after a particular amount of time (e.g., in microseconds, seconds, etc.). The particular amount of time may be provided by the user to transmitter module 210 or may be preprogrammed in transmitter module 210. In some implementations, detector 250 may sample the optical signal generated by multiplexed optical transmitter 220 more or less frequently depending upon a state of transmitter module 210 (e.g., if the temperature of transmitter module 210 is fluctuating, detector 250 may sample the optical signal more frequently).

In some implementations, the optical signal or a portion of the optical signal generated by multiplexed optical transmitter 220 may be received by detector 250, and may be provided to hybrid detector 440 of detector 250. For example, hybrid detector 440 may receive the delayed optical signal A and optical signal B, as described above in FIG. 4. Hybrid detector 440 may combine the delayed optical signal A, optical signal B, and the changed optical signal B in different manners. For example, hybrid detector 440 may calculate a squared sum of the delayed optical signal A and optical signal B (e.g., $(A+B)^2$), and may provide the squared sum to photodiode 450-1. Hybrid detector 440 may calculate a squared difference of the delayed optical signal A and optical signal B (e.g., $(A-B)^2$), and may provide the squared difference to photodiode 450-2. Hybrid detector 440 may calculate a squared sum of the delayed optical signal A and the changed optical signal B (e.g., $(A+B')^2$), and may provide the squared sum to photodiode 450-3. Hybrid detector 440 may calculate a squared difference of the delayed optical signal A and the changed optical signal B (e.g., $(A-B')^2$), and may provide the squared difference to photodiode 450-4.

Photodiode 450-1 may convert the squared sum of the delayed optical signal A and optical signal B (e.g., $(A+B)^2$) into a first electrical signal, and photodiode 450-2 may convert the squared difference of the delayed optical signal A and optical signal B (e.g., $(A-B)^2$) into a second electrical signal. The first electrical signal of photodiode 450-1 and the second electrical signal of photodiode 450-2 may be combined to generate a first QDI signal ($I_{PD}$), and the first QDI signal may be provided to transmitter controller 260.

Photodiode 450-3 may convert the squared sum of the delayed optical signal A and the changed optical signal B (e.g., $(A+B')^2$) into a third electrical signal, and photodiode 450-4 may convert the squared difference of the delayed optical signal A and the changed optical signal B (e.g., $(A-B')^2$) into a fourth electrical signal. The third electrical signal of photodiode 450-2 and the fourth electrical signal of photodiode 450-4 may be combined to generate a second QDI signal ($I'_{PD}$), and the second QDI signal may be provided to transmitter controller 260.

In some implementations, the optical signal generated by multiplexed optical transmitter 220 may include subcarrier signals. For example, each transmitter signal generated by each transmitter 310 may include multiple (e.g., two, three, four, etc.) subcarrier signals. The subcarrier signals may include a portion of data transmitted by each transmitter signal. In some implementations, detector 250 may receive the optical signal (e.g., with the multiple transmitter signals and multiple subcarrier signals) generated by multiplexed optical transmitter 220, and may provide the optical signal to photodiode 450-5. Photodiode 450-5 may create a fifth electrical signal based on the optical signal, and may provide the fifth electrical signal to transmitter controller 260.

As further shown in FIG. 6, process 600 may include generating a graph of the QDI signals and/or the transmitter signals (block 640). For example, transmitter controller 260 may generate a graph of the first QDI signal, the second QDI signal, and the optical signal (e.g., with the multiple transmitter signals) based on the electrical signals received by photodiodes 450. In some implementations, transmitter controller 260 may generate a graph that plots the first QDI signal, the second QDI signal, the transmitter signals based on wavelength (e.g., in nm) and intensity (e.g., in dB). In some implementations, transmitter controller 260 may store and/or recall a graph to/from a memory or storage device (e.g., flash memory, hard-disk drive, or random-access memory). In some implementations, the first QDI signal and the second QDI signal may include signals with peaks and troughs, and the first QDI signal may be offset from the second QDI signal by ninety degrees. In some implementations, each transmitter signal may include multiple subcarrier signals, and may be arranged adjacent to another transmitter signal.

In some implementations, transmitter controller 260 may calculate a quotient of the first QDI signal divided by the second QDI signal (e.g., $I_{PD}/I'_{PD}$), and may calculate an arctangent of the quotient according the Equation (4) described above. Transmitter controller 260 may generate a graph that plots wavelength (e.g., in GHz) versus the arctangent. Transmitter controller 260 may store and/or recall this graph to/from a memory or storage device (e.g., flash memory, hard-disk drive, or random-access memory).

As further shown in FIG. 6, process 600 may include generating a particular transmitter signal with a target wavelength for the modulation format and the baud rate (block 650). For example, transmitter controller 260 may instruct a particular transmitter 310 to generate a particular transmitter signal with a target wavelength based on the modulation format and/or the baud rate. In some implementations, the target wavelength may include a wavelength defined by the modulation format and/or the baud rate for a channel to be generated by particular transmitter 310. In some implementations, the particular transmitter signal may include a specific bit sequence so that the particular transmitter signal may be identified in the graph generated by transmitter controller 260. For example, the specific bit sequence may cause the particular transmitter signal to include a spike with respect to the intensity axis of the graph.

As further shown in FIG. 6, process 600 may include determining whether a point on the graph correlates with the target wavelength of the particular transmitter signal (block 660). For example, transmitter controller 260 may compare the particular transmitter signal with the first and second QDI signals of the graph, and may determine whether a point on the graph correlates with the target wavelength of the particular transmitter signal based on the comparison. In some implementations, transmitter controller 260 may determine whether the spike of the particular transmitter signal intersects a peak or a trough of the first QDI signal and/or the second QDI signal. In some implementations, this determination may be made by comparing the first and/or second QDI signals with the spike present to the first and/or second QDI signals without the spike present.

In some implementations, if transmitter controller 260 determines that the spike of the particular transmitter signal intersects a peak or a trough of the first QDI signal and/or the second QDI signal, transmitter controller 260 may determine that the target wavelength of the particular transmitter signal is correct. In some implementations, if transmitter controller 260 determines that the spike of the particular transmitter signal does not intersect a peak or a trough of the first QDI signal and/or the second QDI signal, transmitter controller 260 may determine that the target wavelength of the particular transmitter signal is incorrect and needs to be adjusted.

In some implementations, transmitter controller 260 may utilize the graph that plots wavelength (e.g., in GHz) versus the arctangent of the quotient of the first QDI signal divided by the second QDI signal (e.g., $I_{PD}/I'_{PD}$) to determine whether a point on the graph correlates with the target wavelength of the particular transmitter signal. In some implementations, transmitter controller 260 may determine the difference in the first and second QDI signals with the spike present to the signal without the spike present. For example, based on the arctangent graph, transmitter controller 260 may determine a particular arctangent value for the target wavelength. In some implementations, if transmitter controller 260 determines that the target wavelength correlates with the particular arctangent value, transmitter controller 260 may determine that the target wavelength of the particular transmitter signal is correct. In some implementations, if transmitter controller 260 determines that the target wavelength does not correlate with the particular arctangent value, transmitter controller 260 may determine that the target wavelength of the particular transmitter signal is incorrect and needs to be adjusted.

As further shown in FIG. 6, if a point on the graph correlates with the target wavelength of the particular transmitter signal (block 660—YES), process 600 may include locking the wavelength of the particular transmitter signal for the modulation format and the baud rate (block 670). For example, if transmitter controller 260 determines that the spike of the particular transmitter signal intersects a peak or a trough of the first QDI signal and/or the second QDI signal, transmitter controller 260 may lock the target wavelength of the particular transmitter 310. In some implementations, if transmitter controller 260 determines that the target wavelength correlates with the particular arctangent value, transmitter controller 260 may lock the target wavelength of the particular transmitter 310. In some implementations, transmitter controller 260 may wait for a short interval and then check the wavelength of transmitter 310 again.

In some implementations, transmitter controller 260 may perform process 600 for all of the transmitter signals of transmitters 310 until all of the wavelengths of the transmitter signals are locked. In such implementations, transmitter controller 260 may enable transmitter module 210 to lock the wavelengths of the transmitter signals for different modulation formats and/or baud rates.

As further shown in FIG. 6, if a point on the graph does not correlate with the target wavelength of the particular transmitter signal (block 660—NO), process 600 may include adjusting the target wavelength of the particular transmitter signal based on the determination (block 680)

and returning to process block 660. For example, if transmitter controller 260 determines that the spike of the particular transmitter signal does not intersect a peak or a trough of the first QDI signal and/or the second QDI signal, transmitter controller 260 may adjust the target wavelength of the particular transmitter 310. In some implementations, transmitter controller 260 may increase the wavelength of the particular transmitter 310 until the spike of the particular transmitter signal intersects a peak or a trough of the first QDI signal and/or the second QDI signal. In some implementations, transmitter controller 260 may decrease the wavelength of the particular transmitter 310 until the spike of the particular transmitter signal intersects a peak or a trough of the first QDI signal and/or the second QDI signal.

In some implementations, if transmitter controller 260 determines that the target wavelength does not correlate with the particular arctangent value, transmitter controller 260 may adjust the target wavelength of the particular transmitter 310. In some implementations, transmitter controller 260 may increase the wavelength of the particular transmitter 310 until the target wavelength correlates with the particular arctangent value. In some implementations, transmitter controller 260 may decrease the wavelength of the particular transmitter 310 until the target wavelength correlates with the particular arctangent value.

In some implementations, transmitter controller 260 may adjust one or more wavelengths of one or more transmitter signals, generated by multiplexed optical transmitter 220, until the spike of the transmitter signal intersects a peak or a trough of the first QDI signal and/or the second QDI signal or until the target wavelength correlates with the particular arctangent value. In such implementations, transmitter controller 260 may eventually lock the wavelengths of all transmitters 310 of multiplexed optical transmitter 220 (e.g., after the one or more wavelengths are properly adjusted).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. Although portions of process 600 are described in the context of creating and using a graph, in some implementations, transmitter controller 260 may perform the portions of process 600 without actually creating and/or using a graph. For example, transmitter controller 260 may perform the portions of process 600 by generating and/or using the information (e.g., the values) contained in the graph.

FIGS. 7A-7G are diagrams of an example 700 relating to example process 600 shown in FIG. 6. In example 700, assume that a user wants to utilize transmitter module 210 for providing optical signals along an optical fiber to receiver module 270. Further, assume that the user determines a modulation format and/or a baud rate for transmitter module 210 based on a length of optical fiber and/or a desired spectral efficiency. For example, if the length of the optical fiber is less than or equal to 500 km, the user may select a 16-QAM modulation format and a 16.5 GBd baud rate. If the length of the optical fiber is greater than 500 km and less than or equal to one-thousand 1,500 km, the user may select an 8-QAM modulation format and a 22 GBd baud rate. If the length of the optical fiber is greater than 1,500 km and less than or equal to 40,000 km, the user may select a QPSK modulation format and a 33 GBd baud rate. The user may provide the selected modulation format and/or the selected baud rate to transmitter controller 260 of transmitter module 210, as indicated by reference number 705 in FIG. 7A.

Figure 7A:
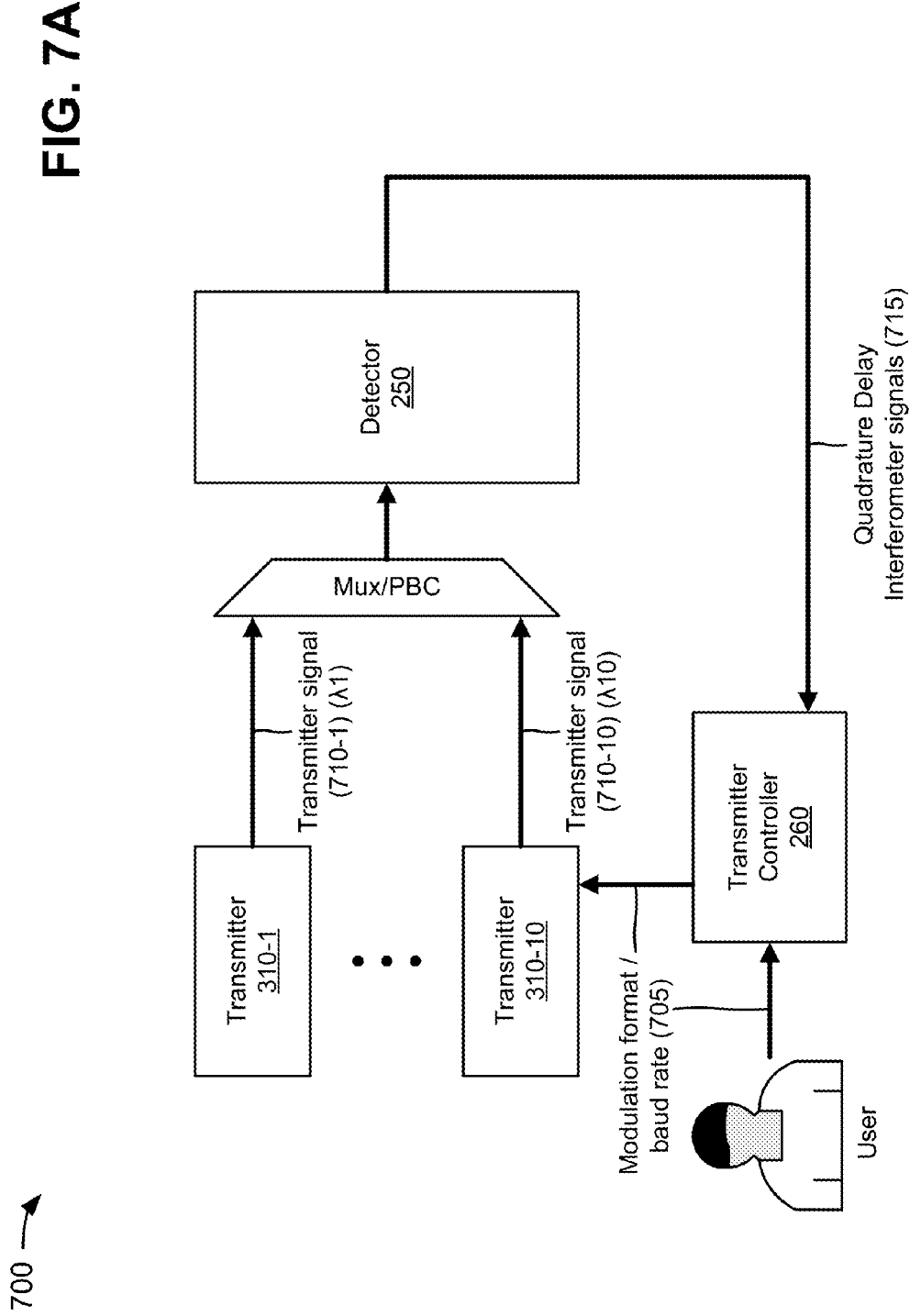

As further shown in FIG. 7A, transmitter controller 260 may provide modulation format/baud rate 705 to transmitters 310-1 through 310-10 (collectively referred to as "transmitters 310" and, in some instances, singularly as "transmitter 310") and to detector 250 of transmitter module 210. Transmitter controller 260 may provide additional information to transmitters 310 and/or detector 250. The additional information may include, for example, information indicating wavelengths to be generated by transmitters 310 based on modulation format/baud rate 705; information indicating which graph of detector to utilize based on modulation format/baud rate 705; information indicating how frequently detector 250 is to sample signals generated by transmitters 310; etc.

Based on modulation format/baud rate 705 and/or the additional information, transmitters 310-1 through 310-10 may generate optical transmitter signals 710-1 through 710-10 (collectively referred to as "transmitter signals 710"), as further shown in FIG. 7A. Each transmitter 310 may transmit transmitter signal 710 at a particular wavelength that is different than wavelengths transmitted by the other transmitters 310. For example, transmitter 310-1 may transmit transmitter signal 710-1 at a first wavelength ($\lambda 1$), transmitter 310-2 may transmit transmitter signal 710-2 at a second wavelength ($\lambda 2$) that is different than the first wavelength, . . . , and transmitter 310-10 may transmit transmitter signal 710-10 at a tenth wavelength ($\lambda 10$) that is different than the first through ninth wavelengths. As further shown in FIG. 7A, transmitters 310 may provide transmitter signals 710 to detector 250.

Figure 7B:
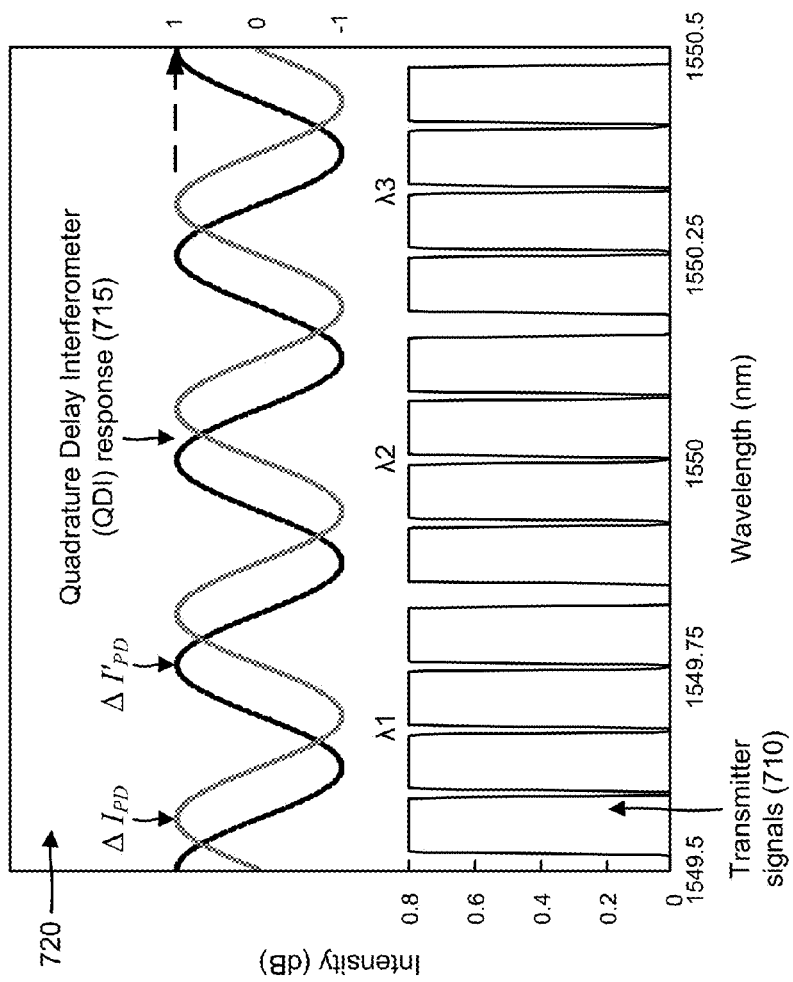

Detector 250 may generate QDI response 715 based on modulation format/baud rate 705, transmitter signals 710, and/or the additional information. Detector 250 may provide transmitter signals 710 and QDI response 715 to transmitter controller 260, as further shown in FIG. 7A. Transmitter controller 260 may compare transmitter signals 710 and QDI response 715 via a graph 720 that includes a wavelength axis (e.g., in GHz) and an intensity axis (e.g., in decibels (dB)), as shown in FIG. 7B. As shown in graph 720, each transmitter signal 710 may include four subcarrier signals (e.g., shown as four square peaks). For example, transmitter signal 710-1 at the first wavelength ($\lambda 1$) may include four subcarrier signals, transmitter signal 710-2 at the second wavelength ($\lambda 2$) may include four subcarrier signals, etc. As further shown in graph 720, QDI response 715 may include peaks and troughs.

Figure 7C:
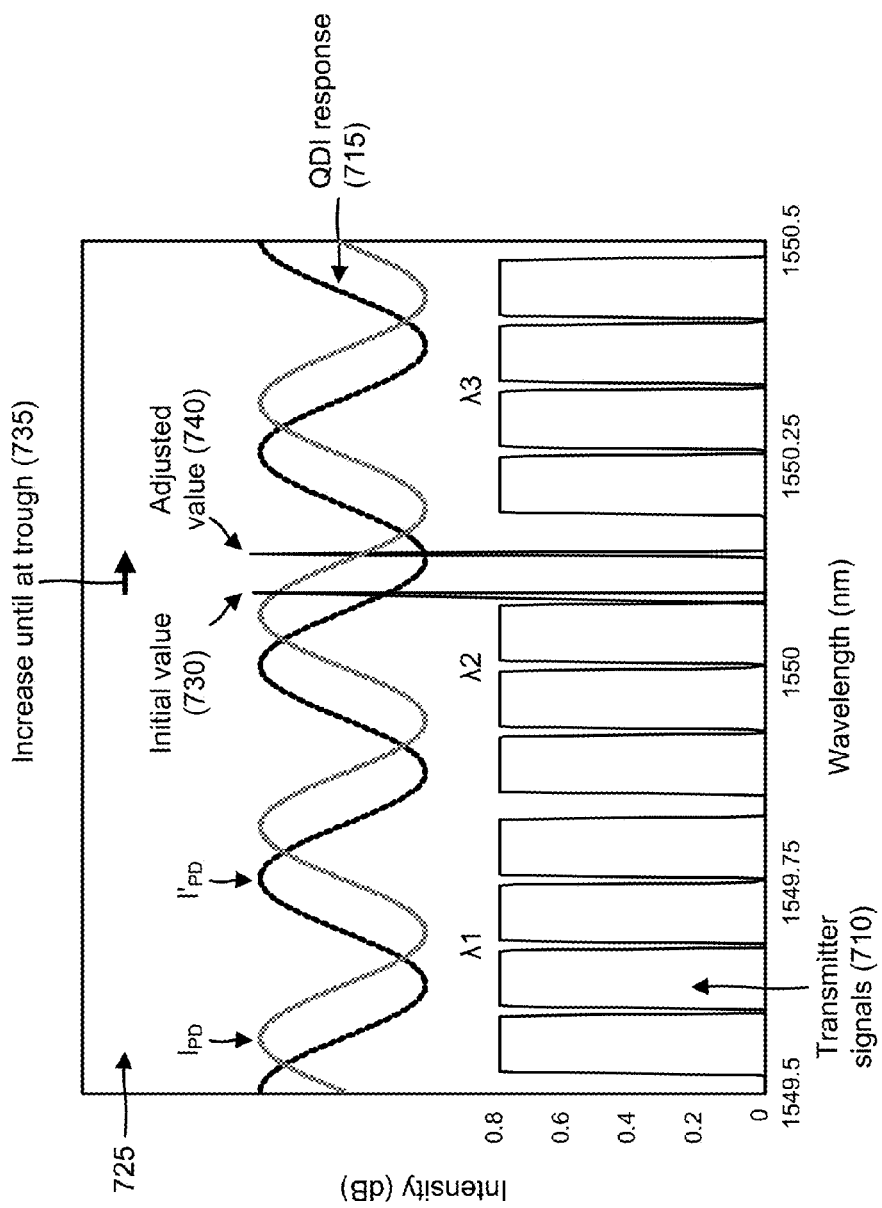

In some implementations, transmitter controller 260 may determine a target wavelength (e.g., about 20 GHz) for transmitter 310-2, and may instruct transmitter 310-2 to generate a particular transmitter signal at the target wavelength. As shown in FIG. 7C, transmitter controller 260 may generate a graph 725 to display QDI response 715 and the particular transmitter signal, as indicated by reference number 730. Particular transmitter signal 730 may include a specific bit sequence that causes particular transmitter signal 730 to include a spike with respect to the intensity axis of graph 725. Transmitter controller 260 may determine whether the spike of particular transmitter signal 730 intersects a peak or a trough of QDI response 715.

As further shown in FIG. 7C, since the spike of particular transmitter signal 730 does not intersect a peak or a trough of QDI response 715, transmitter controller 260 may determine that the wavelength of particular transmitter signal 730 needs to be adjusted. For example, transmitter controller 260 may determine that the wavelength of particular transmitter signal 730 needs to be increased, as indicated by reference number 735, to create an adjusted particular transmitter signal 740. Since the spike of adjusted particular transmitter signal 740 intersects a trough of QDI response 715, transmitter controller 260 may determine that the wavelength of transmitter 310-2 is properly locked.

Figure 7D:
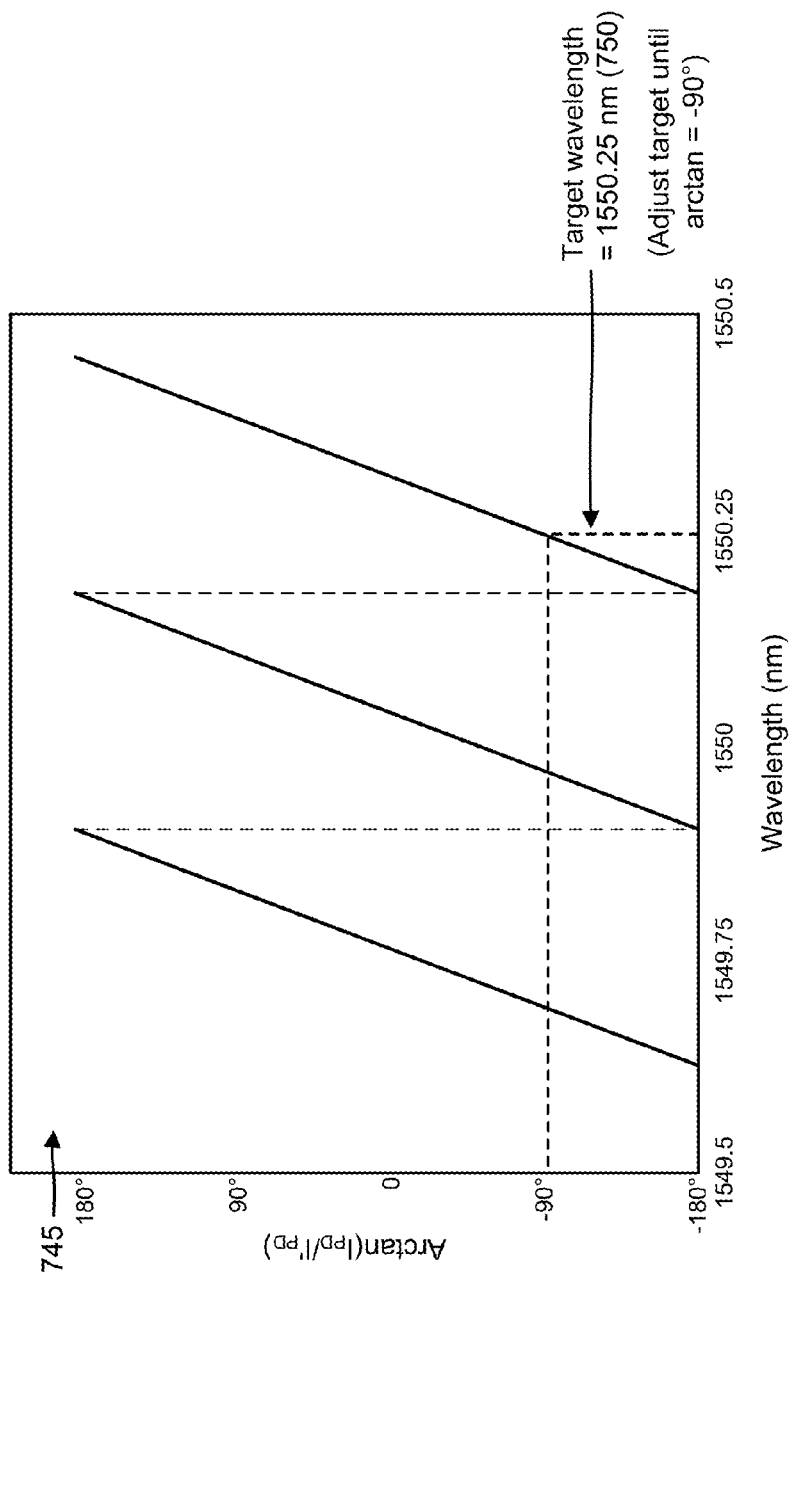

In some implementations, transmitter controller 260 may generate a graph 745 to display an arctangent of the quotient of QDI response 715 versus wavelengths of transmitter signals 710, as shown in FIG. 7D. Transmitter controller 260 may utilize graph 745 to identify a particular wavelength (e.g., 1550.25 nm) and a particular arctangent value (e.g., −90 degrees) that correlates with the particular wavelength. Transmitter controller 260 may instruct transmitter 310-2 to generate a particular transmitter signal at a target wavelength 750 (e.g., about 1550.25 nm), and may determine whether target wavelength 750 correlates with the particular arctangent value. If transmitter controller 260 determines that target wavelength 750 correlates with the particular arctangent value, transmitter controller 260 may determine that the wavelength 750 of transmitter 310-2 is properly locked. If transmitter controller 260 determines that target wavelength 750 does not correlate with the particular arctangent value, transmitter controller 260 may adjust target wavelength 750 of transmitter 310-2.

Figure 7E:
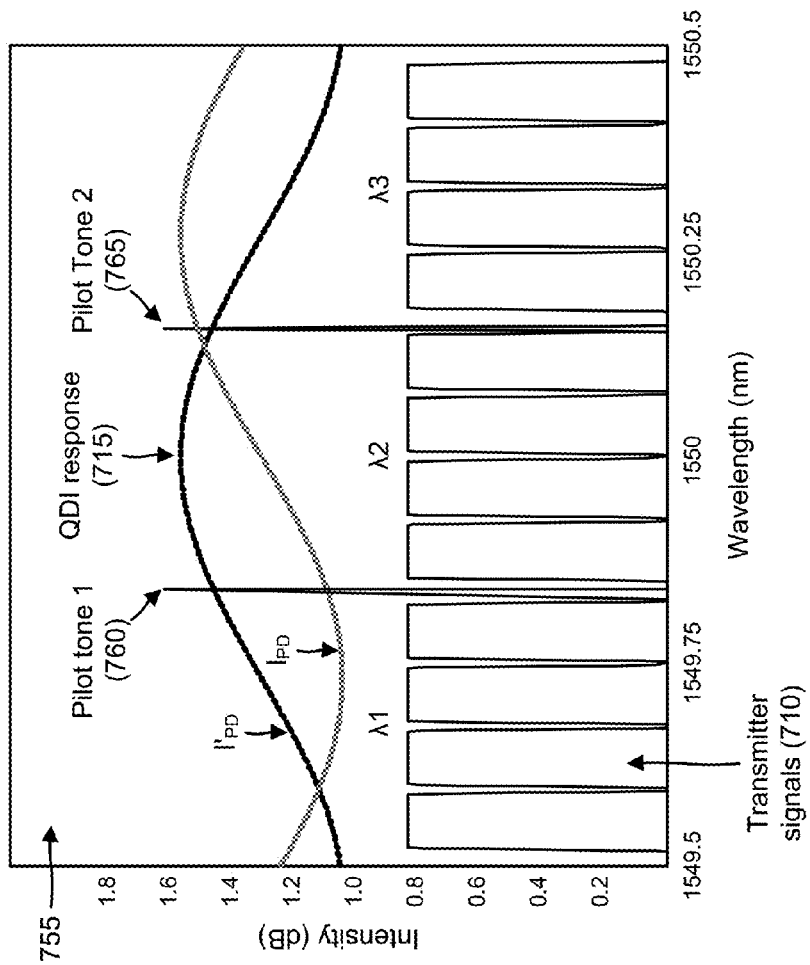

In some implementations, transmitter controller 260 may instruct DSP 320 to generate a pilot signal at a target wavelength (e.g., about −0.16 to the left of the center of the channel) for a channel generated by transmitter 310-2. As shown in FIG. 7E, transmitter controller 260 may generate, or recall from storage, a graph 755 to identify wavelength values associated with QDI response 715. Using the QDI response 715, the wavelength associated with pilot tone 760 can be identified. In some implementations, transmitter controller 260 may next instruct DSP 320 to generate a second pilot signal at a target wavelength (e.g., about +0.16 nm to the right of the center of the channel) for a channel generated by transmitter 310-2. Using QDI response 715, the wavelength associated with the second pilot tone 765 can be identified. Transmitter controller 260 may determine whether the spikes of pilot tones 760/765 intersect a peak or a trough of QDI response 715. As further shown in FIG. 7E, since the spikes of pilot tones 760/765 do not intersect a peak or a trough of QDI response 715, transmitter controller 260 may not be able to utilize graph 755, and may utilize another graph 770, as shown in FIG. 7F.

Figure 7F:
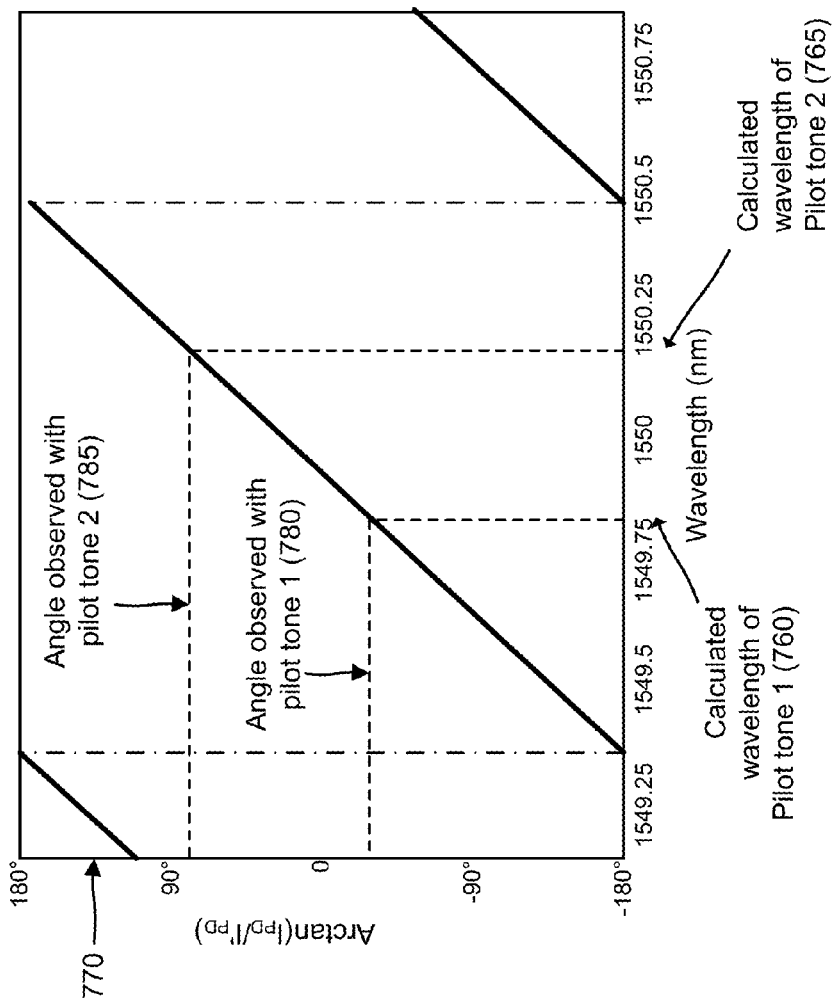

As shown in FIG. 7F, graph 770 may include an arctangent of the quotient of QDI response 715 versus wavelengths of transmitter signals 710. Transmitter controller 260 may utilize graph 770 to identify the wavelength of pilot tone 1 (e.g., 1549.84 nm), of pilot tone 760, using the particular arctangent value (e.g., −15 degrees) determined from QDI response 715. Transmitter controller 260 may also utilize graph 770 to identify the wavelength of the second pilot tone 765 (e.g., 1550.16 nm), of maximum transmitter signal 765, and a particular arctangent value (e.g., 80 degrees) determined from QDI response 715. Transmitter controller 260 may compute the wavelength of the transmitter as the average of the wavelength computed for pilot tone 1 and pilot tone 2 (e.g., 1550 nm). If transmitter controller 260 determines that the wavelength value is not the desired value, transmitter controller 260 may adjust the target wavelength of transmitter 310-2.

If transmitter controller 260 determines that a spike (from a bit sequence 730 or pilot tone 760) (e.g., generated by a particular transmitter 310) intersects with a peak or a trough of QDI response 715, transmitter controller 260 may determine that the wavelength of the particular transmitter 310 is locked, as indicated by reference number 780 in FIG. 7G. For example, assume that spikes of transmitter signals 710-1 and 710-10 (e.g., generated by transmitters 310-1 and 310-10) intersect with peaks or a troughs of QDI response 715. In such an example, transmitter controller 260 determine that the wavelengths of transmitters 310-1 and 310-10 are properly locked.

If transmitter controller 260 determines that a spike (from a bit sequence 730 or pilot tone 760) of a particular transmitter signal 710 (e.g., generated by a particular transmitter 310) does not intersect a peak or a trough of QDI response 715, transmitter controller 260 may adjust a wavelength of the particular transmitter 310, as indicated by reference number 785 in FIG. 7G. For example, assume that a spike (from a bit sequence 730 or pilot tone 760) of transmitter signal 710-1 (e.g., generated by transmitter 310-1) intersects with a peak or a trough of QDI response 715, and that a spike (from a bit sequence 730 or pilot tone 760) of transmitter signal 710-10 (e.g., generated by transmitter 310-10) does not intersect with a peak or a trough of QDI response 715. In such an example, transmitter controller 260 may lock the wavelength of transmitter 310-1, and may adjust the wavelength of transmitter 310-10.

As shown by example 700, transmitter module 210 may be dynamically configured to different modulation formats and/or baud rates, and may be controlled at the different modulation formats and/or baud rates. A wavelength channel spacing of transmitter module 210 may be altered based on a selected modulation format and/or baud rate. Transmitter module 210 may accurately determine and lock wavelengths of transmitters 310, which may enable the channel spacing of the transmitter signals to be accurately aligned.

As indicated above, FIGS. 7A-7G are provided merely as an example. Other examples are possible and may differ from what was described with regard to FIGS. 7A-7G. In some implementations, the various operations described in connection with FIGS. 7A-7G may be performed automatically or at the request of the user.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system, comprising:
a transmitter configured to:
receive information associated with a modulation format and a baud rate for transmission of an optical signal, and
generate optical signals based on the modulation format and the baud rate;
a quadrature-delay-interferometer detector configured to:
receive the information associated with the modulation format and the baud rate,
receive the optical signals, and
generate quadrature-delay-interferometer signals based on the optical signals, the modulation format, and the baud rate; and
a controller configured to:
supply control signals to the transmitter,
the transmitter generating a particular optical signal having a particular wavelength based on the control signals,
the particular optical signal having the modulation format and the baud rate, and
selectively control the particular wavelength of the particular optical signal, such that a point of the quadrature-delay-interferometer signals is associated with the particular wavelength of the particular optical signal.

2. The optical system of claim 1, where, when selectively controlling the particular wavelength of the particular optical signal, the controller is further configured to:
adjust the particular wavelength of the particular optical signal, to create an adjusted optical signal, based on determining that a point of the quadrature-delay-interferometer signals is not associated with the particular wavelength of the particular optical signal.

3. The optical system of claim 2, where the controller is further configured to:
set the adjusted particular wavelength of the adjusted optical signal when a point of the quadrature-delay-interferometer signals is associated with the adjusted particular wavelength of the adjusted optical signal.

4. The optical system of claim 2, where, when adjusting the particular wavelength of the particular optical signal, the controller is further configured to one of:
increase the particular wavelength of the particular optical signal, or
decrease the particular wavelength of the particular optical signal.

5. The optical system of claim 1, where, when selectively controlling the particular wavelength of the particular optical signal, the controller is further configured to:
determine whether the particular optical signal intersects a peak or a trough of the quadrature-delay-interferometer signals.

6. The optical system of claim 1, where the modulation format includes one of:
a quadrature phase-shift keying (QPSK) modulation format,
a 16-quadrature amplitude modulation (16-QAM) modulation format, or
an 8-QAM modulation format.

7. The optical system of claim 1, where the baud rate includes one of:
approximately thirty-three (33) gigabaud,
approximately 16.5 gigabaud, or
approximately twenty-two (22) gigabaud.

8. An optical system, comprising:
an optical transmitter;
a quadrature-delay-interferometer detector; and
a controller configured to:
receive a modulation format and a baud rate for transmission of an optical signal,
instruct the optical transmitter to generate optical signals based on the modulation format and the baud rate,
instruct the quadrature-delay-interferometer detector to generate quadrature-delay-interferometer signals based on the optical signals, the modulation format, and the baud rate,
supply control signals to the optical transmitter,
the optical transmitter generating, based on the control signals, a particular optical signal having a particular wavelength,
the particular optical signal having the modulation format and the baud rate,
determine whether the particular optical signal intersects a peak or a trough of the quadrature-delay-interferometer signals, and
selectively control the optical transmitter to lock or adjust the particular wavelength of the particular optical signal for the modulation format and the baud rate based on whether the particular optical signal intersects a peak or a trough of the quadrature-delay-interferometer signals.

9. The optical system of claim 8, where, when selectively controlling the optical transmitter to lock or adjust the particular wavelength, the controller is further configured to:
instruct the optical transmitter to lock the particular wavelength of the particular optical signal when the particular optical signal intersects a peak or a trough of the quadrature-delay-interferometer signals.

10. The optical system of claim 8, where, when selectively controlling the optical transmitter to lock or adjust the particular wavelength, the controller is further configured to:
instruct the optical transmitter to adjust the particular wavelength of the particular optical signal, to create an adjusted optical signal, when the particular optical signal does not intersect a peak or a trough of the quadrature-delay-interferometer signals.

11. The optical system of claim 10, where the controller is further configured to:
determine whether the adjusted particular wavelength intersects a peak or a trough of the quadrature-delay-interferometer signals, and
instruct the optical transmitter to lock the adjusted particular wavelength of the adjusted optical signal when the adjusted optical signal intersects a peak or a trough of the quadrature-delay-interferometer signals.

12. The optical system of claim 10, where, when instructing the optical transmitter to adjust the particular wavelength, the controller is further configured to:
instruct the optical transmitter to increase the particular wavelength of the particular optical signal.

13. The optical system of claim 8, where the modulation format includes one of:
a quadrature phase-shift keying (QPSK) modulation format, a 16-quadrature amplitude modulation (16-QAM) modulation format, or an 8-QAM modulation format.

14. The optical system of claim 8, where the baud rate includes one of:
   approximately thirty-three (33) gigabaud,
   approximately 16.5 gigabaud, or
   approximately twenty-two (22) gigabaud.

15. A method, comprising:
   receiving, by a device, a modulation format and a baud rate for transmission of an optical signal;
   generating, by the device, optical signals based on the modulation format and the baud rate;
   generating, by the device, quadrature-delay-interferometer signals based on the optical signal, the modulation format, and the baud rate;
   generating, by the device, a particular optical signal with a particular wavelength for the modulation format and the baud rate;
   determining, by the device, whether a point of the quadrature-delay-interferometer signals is associated with the particular wavelength of the particular optical signal; and
   setting or adjusting, by the device, the particular wavelength of the particular optical signal for the modulation format and the baud rate based on whether a point of the quadrature-delay-interferometer signals is associated with the particular wavelength of the particular optical signal.

16. The method of claim 15, where setting or adjusting the particular wavelength comprises:
   setting the particular wavelength of the particular optical signal when a point of the quadrature-delay-interferometer signals is associated with the particular wavelength of the particular optical signal.

17. The method of claim 15, where setting or adjusting the particular wavelength comprises:
   adjusting the particular wavelength of the particular optical signal, to create an adjusted optical signal, when a point of the quadrature-delay-interferometer signals is not associated with the particular wavelength of the particular optical signal.

18. The method of claim 17, further comprising:
   determining whether a point of the quadrature-delay-interferometer signals is associated with the adjusted particular wavelength of the adjusted optical signal; and
   setting the adjusted particular wavelength of the adjusted optical signal when a point of the quadrature-delay-interferometer signals is associated with the adjusted particular wavelength of the adjusted optical signal.

19. The method of claim 17, where adjusting the particular wavelength of the particular optical signal comprises:
   decreasing the particular wavelength of the particular optical signal.

20. The method of claim 15, where determining whether a point of the quadrature-delay-interferometer signals is associated with the particular wavelength comprises one of:
   determining whether the particular optical signal intersects a peak or a trough of the quadrature-delay-interferometer signals, or
   determining whether the particular wavelength correlates with an arctangent value of a quotient of the quadrature-delay-interferometer signals.

* * * * *